United States Patent
Tsukagoshi

(10) Patent No.: US 11,341,976 B2
(45) Date of Patent: May 24, 2022

(54) TRANSMISSION APPARATUS, TRANSMISSION METHOD, PROCESSING APPARATUS, AND PROCESSING METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/966,294

(22) PCT Filed: Jan. 28, 2019

(86) PCT No.: PCT/JP2019/002822
§ 371 (c)(1),
(2) Date: Jul. 30, 2020

(87) PCT Pub. No.: WO2019/155930
PCT Pub. Date: Aug. 15, 2019

(65) Prior Publication Data
US 2020/0372919 A1    Nov. 26, 2020

(30) Foreign Application Priority Data

Feb. 7, 2018 (JP) .............................. JP2018-020564

(51) Int. Cl.
*G10L 19/008* (2013.01)
*G10L 19/16* (2013.01)
(Continued)

(52) U.S. Cl.
CPC .......... *G10L 19/008* (2013.01); *G10L 19/167* (2013.01)

(58) Field of Classification Search
CPC ..... G10L 19/008; G10L 19/167; G10L 19/16; G10L 19/00; H04S 7/303; H04S 7/00;
(Continued)

(56) References Cited

U.S. PATENT DOCUMENTS 4,757,379 A * 7/1988 Wright ............... G05B 19/4207
348/42
2016/0156944 A1   6/2016 Hattori et al.
(Continued)

FOREIGN PATENT DOCUMENTS

WO   WO 2015/008613 A1   1/2015
WO   WO 2016/002738 A1   1/2016
(Continued)

OTHER PUBLICATIONS

Günel, B. et al., "Spatial Synchronization of Audiovisual Objects by 3D Audio Object Coding", 2010 IEEE International Workshop on Multimedia Signal Processing (MMSP '10), 2010, pp. 460-465, XP031830628, DOI: 10.1109/MMSP.2010.5662065, ISBN: 978-1-4244-8110-1, 6 total pages, *Paragraph IV-A "Correction of audio object position" , p. 461*.

(Continued)

*Primary Examiner* — Leshui Zhang
(74) *Attorney, Agent, or Firm* — Oblon, McClelland, Maier & Neustadt, L.L.P.

(57) ABSTRACT

A voice output corresponding to a fixed position of a wide viewing angle image is easily obtained.

A transmission unit configured to transmit spatial voice data and information regarding a predetermined number of registered viewpoints is included. For example, the spatial voice data is data of scene-based audio. Then, for example, the data of the scene-based audio is each component of an HoA format. For example, the information regarding a viewpoint includes information regarding an azimuth angle (azimuth information) and an elevation angle (elevation angle information) that indicate a position of this viewpoint. For example, the data of the scene-based audio and the (Continued)

information regarding the predetermined number of registered viewpoints are transmitted with being included in a packet of object audio.

19 Claims, 28 Drawing Sheets

(51) Int. Cl.
| | |
|---|---|
| H04N 21/218 | (2011.01) |
| H04N 21/262 | (2011.01) |
| H04N 21/81 | (2011.01) |
| H04N 21/845 | (2011.01) |
| H04N 21/854 | (2011.01) |
| H04S 3/00 | (2006.01) |
| H04S 7/00 | (2006.01) |
| H04R 3/00 | (2006.01) |
| H04R 1/40 | (2006.01) |

(58) Field of Classification Search
CPC ............. H04S 2400/15; H04S 2420/03; H04S 2420/11; H04S 3/008; H04S 3/00; H04R 2201/401; H04R 3/005; H04R 3/00; H04R 1/406; H04R 1/40; H04N 21/233; H04N 21/439
USPC .................. 704/500–504; 381/1–23; 700/94
See application file for complete search history.

(56) References Cited

U.S. PATENT DOCUMENTS

2017/0263259 A1\* 9/2017 Tsukagoshi .......... H04N 21/435
2018/0165358 A1\* 6/2018 Hirabayashi ............ G06F 16/18

FOREIGN PATENT DOCUMENTS

| | | | |
|---|---|---|---|
| WO | WO-2016002738 A1 \* | 1/2016 | ............. G06F 16/18 |
| WO | WO 2016/039287 A1 | 3/2016 | |
| WO | WO-2016039287 A1 \* | 3/2016 | ........... H04N 21/439 |
| WO | WO 2017/168949 A1 | 10/2017 | |
| WO | WO 2017/195881 A1 | 11/2017 | |

OTHER PUBLICATIONS

Niamut, O. A., et al., "Towards A Format-agnostic Approach for Production, Delivery and Rendering of Immersive Media", MMSys'13, 2013, pp. 249-260, XP058018780, DOI: 10.1145/2483977. 2484007, ISBN: 978-1-4503-1894-5, 12 total pages. \*Paragraph 6.1 "Sound Scene Descriptions And Rendering", p. 257 \*.

International Search Report dated Mar. 12, 2019 in PCT/JP2019/ 002822 filed on Jan. 28, 2019, citing documents AA-AC and AO-AS therein, 2 pages.

Nishimura, "Ambisonics", The Institute of Image Information and Television Engineers Journal, 2014, vol. 68, No. 8, 14 total pages (with unedited computer-generated English translation).

\* cited by examiner

FIG. 5
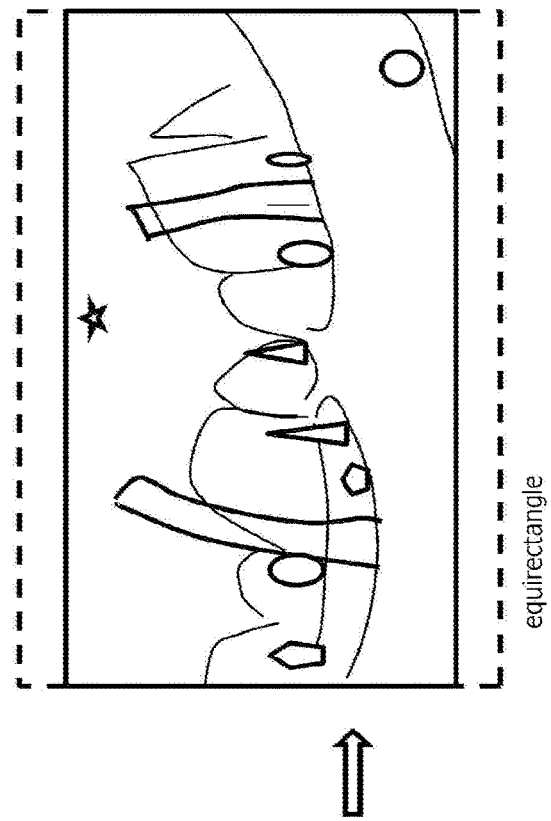
(b) equirectangle
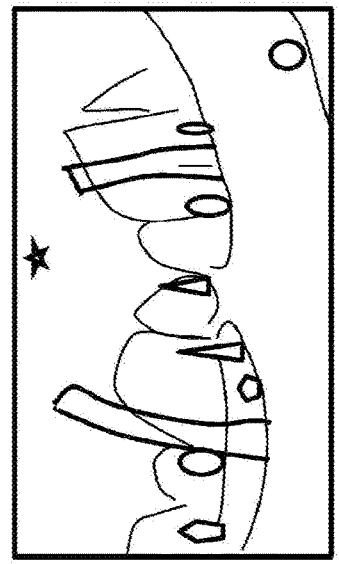
(c) Scaled equirectangle
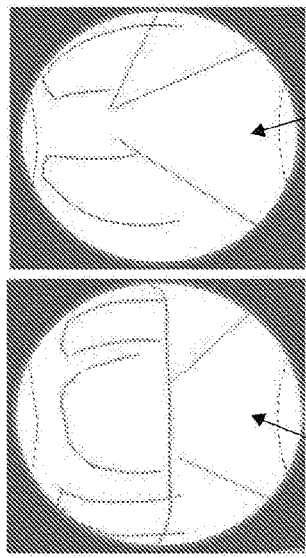
(a) FRONT SURFACE IMAGE / BACK SURFACE IMAGE

FIG. 6

HEVC SPS

| Syntax | No. of Bits | Format |
|---|---|---|
| Seq_parameter_set_rbsp() { | | |
|    SPS_video_parameter_set_id | | uimsbf |
|    SPS_max_sub_layers_minus1 | | |
| | | |
|       : | | |
| | | |
|    pic_width_in_luma_samples | | ue(v) |
|    pic_height_in_luma_samples | | ue(v) |
|    conformance_window_flag | | u(1) |
|    if( conformance_window_flag ) { | | |
|       conf_win_left_offset | | ue(v) |
|       conf_win_right_offset | | ue(v) |
|       conf_win_top_offset | | ue(v) |
|       conf_win_bottom_offset | | ue(v) |
|    } | | |
| | | |

FIG. 8

Rendering_metadata

| Syntax | No. of Bits | Format |
|---|---|---|
| Rendering_metadata( ) { | | |
|   rendering_metadata_id | 16 | uimsbf |
|   rendering_metadata_length | 16 | uimsbf |
|   start_offset_sphere_latitude | 16 | uimsbf |
|   start_offset_sphere_longitude | 16 | tcimsbf |
|   end_offset_sphere_latitude | 16 | uimsbf |
|   end_offset_sphere_longitude | 16 | tcimsbf |
|   projection_pic_size_horizontal | 16 | uimsbf |
|   projection_pic_size_vertical | 16 | uimsbf |
|   scaling_ratio_horizontal | 16 | uimsbf |
|   scaling_ratio_vertical | 16 | uimsbf |
|   reference_point_horizontal | 16 | uimsbf |
|   reference_point_vertical | 16 | uimsbf |
|   format_type | 5 | uimsbf |
|   backwardcompatible | 1 | bslbf |
|   reserved | 2 | bslbf |
|   video_viewpoint_grid() | 8 | uimsbf |
| } | | |

FIG. 9

Semantics

| | |
|---|---|
| rendering_metadata_id (16bits) | ID FOR IDENTIFYING rendering_metadata STRUCTURE |
| rendering_metadata_length (16bits) | BYTE SIZE OF rendering_metadata STRUCTURE |
| start_offset_sphere_latitude (16bits) | LATITUDE (VERTICAL DIRECTION) OF CUTOUT START OFFSET FROM SPHERICAL SURFACE |
| start_offset_sphere_longitude (16bits) | LONGITUDE (HORIZONTAL DIRECTION) OF CUTOUT START OFFSET FROM SPHERICAL SURFACE |
| end_offset_sphere_latitude (16bits) | LATITUDE (VERTICAL DIRECTION) OF CUTOUT END OFFSET FROM SPHERICAL SURFACE |
| end_offset_sphere_longitude (16bits) | LONGITUDE (HORIZONTAL DIRECTION) OF CUTOUT END OFFSET FROM SPHERICAL SURFACE |
| projection_pic_size_horizontal (16bits) | HORIZONTAL PIXEL COUNT FROM top-left IN SIZE OF projection picture |
| projection_pic_size_vertical (16bits) | VERTICAL PIXEL COUNT FROM top-left IN SIZE OF projection picture |
| scaling_ratio_horizontal (16bits) | HORIZONTAL SCALING RATIO FROM ORIGINAL SIZE OF projection picture |
| scaling_ratio_vertical (16bits) | VERTICAL SCALING RATIO FROM ORIGINAL SIZE OF projection picture |
| reference_point_horizontal (16bits) | HORIZONTAL PIXEL POSITION OF REFERENCE POINT OF projection picture |
| reference_point_vertical (16bits) | VERTICAL PIXEL POSITION OF REFERENCE POINT OF projection picture |
| format_type (5bits) | FORMAT TYPE OF projection picture<br>  0: equirectangular<br>  1: cross-cubic<br>  2: partitioned cross cubic<br>  others reserved |
| backwardcompatible (1bit) | INDICATE WHETHER OR NOT BACKWARD COMPATIBLE SETTING IS MADE<br>  0: BACKWARD COMPATIBLE SETTING IS NOT MADE<br>  1: BACKWARD COMPATIBLE SETTING IS MADE |
| video_viewpoint_grid() | INFORMATION REGARDING GROUPED VIEWPOINT GRID |

FIG. 10

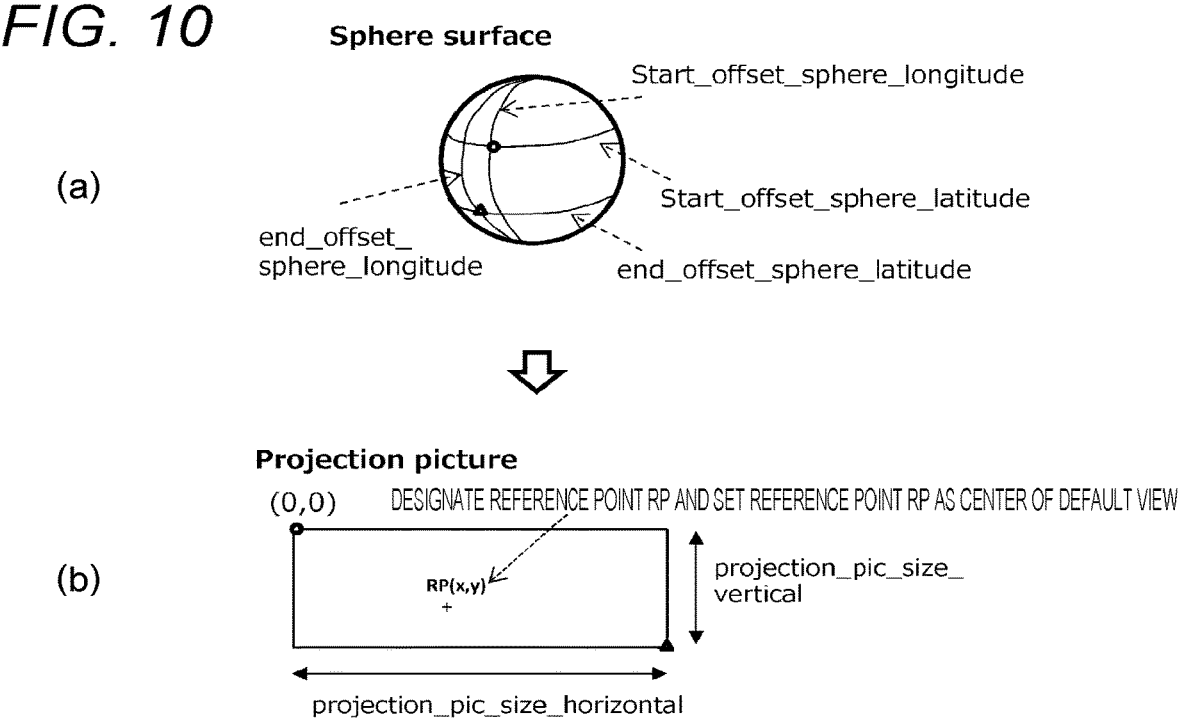

(a) Sphere surface (b) Projection picture

FIG. 11

| Syntax | No. of Bits | Format |
|---|---|---|
| video_viewpoint_grid() { | | |
|   initial_viewpoint_grid_center_azimuth | 16 | uimslbf |
|   initial_viewpoint_grid_center_elevation | 16 | uimslbf |
|   number_of_group | 8 | uimsbf |
|   for( j = 0; j < number_of_group ; j++ ){ | | |
|     group_id | 8 | uimsbf |
|     category | 8 | uimsbf |
|     number_of_viewpoint_grids | 8 | uimsbf |
|     for( j = 0; j < number_of_viewpoint_grids ; j++ ){ | | |
|       viewpoint_grid_id | 8 | uimsbf |
|       sub_category | 8 | uimsbf |
|       video_center_azimuth | 16 | uimsbf |
|       video_center_elevation | 16 | uimsbf |
|     } | | |
|   } | | |

FIG. 12 video_viewpoint_grid() SEMANTICS

| | |
|---|---|
| initial_viewpoint_grid_center_azimuth (16bits) | INDICATE AZIMUTH ANGLE OF INITIAL (DEFAULT) viewpoint POSITION BY OFFSET FROM Reference point |
| initial_viewpoint_grid_center_elevation (16bits) | INDICATE ELEVATION ANGLE OF INITIAL (DEFAULT) viewpoint POSITION BY OFFSET FROM Reference point |
| number_of_group (8bits) | NUMBER OF GROUPS |
| group_id (8bits) | GROUP ID |
| category (8bits) | CATEGORY (CLASSIFICATION TYPE) OF GROUP |
| number_of_viewpoint_grids (8bits) | NUMBER OF viewpoint_grids |
| viewpoint_grid_id (8bits) | viewpoint_grid ID |
| sub_category (8bits) | CATEGORY IN GROUP OF viewpoint_grid |
| video_center_azimuth (16bits) | AZIMUTH ANGLE OF viewpoint POSITION |
| video_center_elevation (16bits) | ELEVATION ANGLE OF viewpoint POSITION |

FIG. 13
(a) PLANARLY-CONVERTED IMAGE
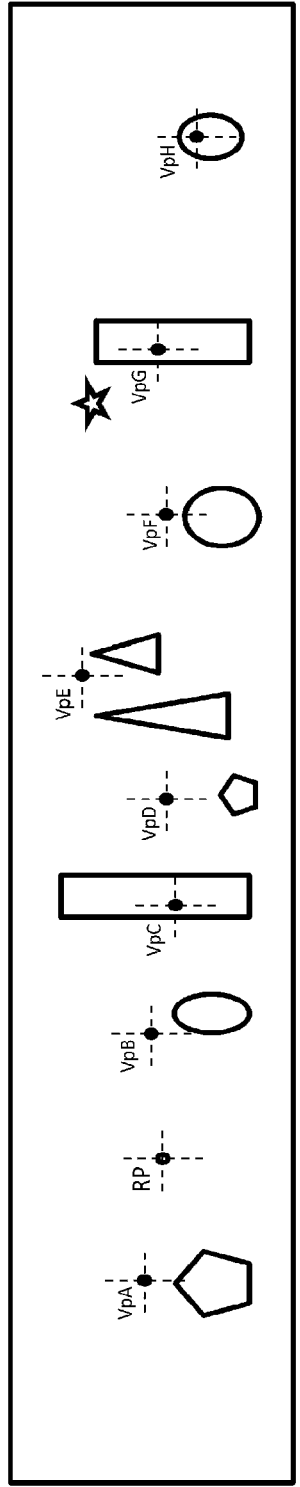
(b) DISPLAY SELECTION IDENTIFICATION
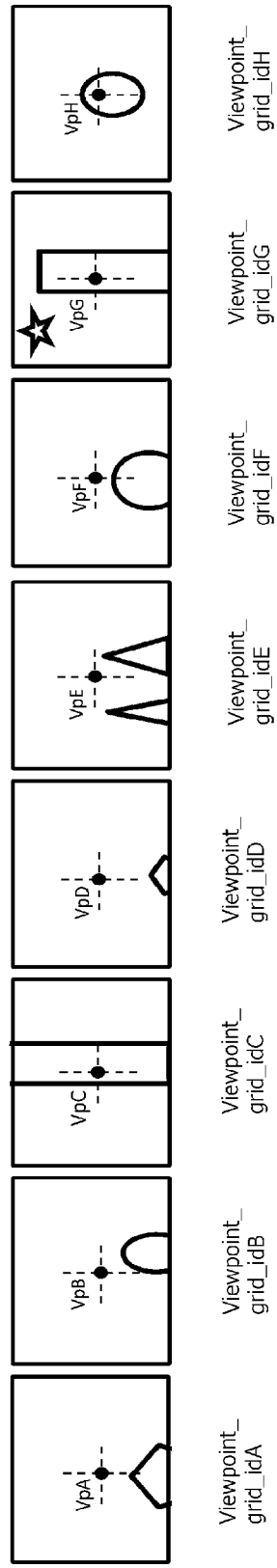

FIG. 19

| Syntax | No. of Bits | Format |
| --- | --- | --- |
| audio_viewpoint_grid() { | | |
|    initial_viewpoint_grid_center_azimuth | 16 | uimslbf |
|    initial_viewpoint_grid_center_elevation | 16 | uimslbf |
|    number_of_group | 8 | uimsbf |
|    for( j = 0; j < number_of_group ; j++ ){ | | |
|      group_id | 8 | uimsbf |
|      category | 8 | uimsbf |
|      number_of_viewpoint_grids | 8 | uimsbf |
|      for( j = 0; j < number_of_viewpoint_grids ; j++ ){ | | |
|        viewpoint_grid_id | 8 | uimsbf |
|        sub_category | 8 | uimsbf |
|        audio_center_azimuth | 16 | uimsbf |
|        audio_center_elevation | 16 | uimsbf |
|      } | | |
|  } | | |

FIG. 20

| | |
|---|---|
| audio_viewpoint_grid() SEMANTICS | |
| initial_viewpoint_grid_center_azimuth (16bits) | INDICATE AZIMUTH ANGLE OF INITIAL (DEFAULT) viewpoint POSITION BY OFFSET FROM Reference point |
| initial_viewpoint_grid_center_elevation (16bits) | INDICATE ELEVATION ANGLE OF INITIAL (DEFAULT) viewpoint POSITION BY OFFSET FROM Reference point |
| number_of_group (8bits) | NUMBER OF GROUPS |
| group_id (8bits) | GROUP ID |
| category (8bits) | CATEGORY (CLASSIFICATION TYPE) OF GROUP |
| number_of_viewpoint_grids (8bits) | NUMBER OF viewpoint_grids |
| viewpoint_grid_id (8bits) | viewpoint_grid ID |
| sub_category (8bits) | CATEGORY IN GROUP OF viewpoint_grid |
| audio_center_azimuth (16bits) | AZIMUTH ANGLE OF viewpoint POSITION |
| audio_center_elevation (16bits) | ELEVATION ANGLE OF viewpoint POSITION |

FIG. 22

```
<Period>
  <AdaptationSet mimeType="video/mp4" codecs="hev1.xx.xx.L153,xx, hev1.yy.yy.L153,yy">
    <Representation>
      <SupplementaryDescriptor schemeIdUri="urn:brdcst:video:vrviewgrid" value="1"/>
      <width="3840" height="2160" frameRate="60"
       codecs="hev1.xx.xx.L153,xx"
       level="0"/>
      <BaseURL>videostreamVR.mp4</BaseURL>
    </Representation>
  </AdaptationSet>
  <AdaptationSet mimeType="audio/mp4" codecs="mpegh.xx.xx.xx,xx">
    <Representation>
      <SupplementaryDescriptor schemeIdUri="urn:brdcst:audio:vrviewgrid" value="1"/>
      <BaseURL>audiostreamVR.mp4</BaseURL>
    </Representation>
  </AdaptationSet>
</Period>
```

MPD

TRANSMISSION APPARATUS, TRANSMISSION METHOD, PROCESSING APPARATUS, AND PROCESSING METHOD

TECHNICAL FIELD

The present technology relates to a transmission apparatus, a transmission method, a processing apparatus, and a processing method, and more specifically, relates to a transmission apparatus that transmits data of scene-based audio, and the like.

BACKGROUND ART

A wide viewing angle image is captured using a mirror, a lens, and the like that are provided for a wide viewing angle. In the case of transmitting moving image data of a wide viewing angle image, on the reception side, when an image at a fixed position of the wide viewing angle image is cut out and displayed, a voice output is also considered to be interlocked using a stereophonic reproduction method. As a stereophonic reproduction method, a scene-based method has been known. Non-patent Document 1 describes Ambisonics (scene-based audio).

CITATION LIST

Non-Patent Document

Non-patent Document 1: Ryuichi Nishimura, "Ambisonics", The Institute of Image Information and Television Engineers Journal, Vol. 68, No. 8, pp. 616 to 620 (2014)

SUMMARY OF THE INVENTION

PROBLEMS TO BE SOLVED BY THE INVENTION

The object of the present technology is to enable a voice output corresponding to a fixed position of a wide viewing angle image to be easily obtained.

SOLUTIONS TO PROBLEMS

According to an aspect of the present technology, a transmission apparatus includes a transmission unit configured to transmit spatial voice data and information regarding a predetermined number of registered viewpoints.

In the present technology, spatial voice data and information regarding a predetermined number of registered viewpoints are transmitted by a processing unit. For example, the information regarding a viewpoint may include information regarding an azimuth angle (azimuth information) and an elevation angle (elevation angle information) that indicate a position of this viewpoint. For example, the spatial voice data may be data of scene-based audio. In this case, for example, the data of the scene-based audio may be each component of an HoA format.

For example, the transmission unit may transmit the data of the scene-based audio and the information regarding the predetermined number of registered viewpoints with being included in a packet of object audio. In this case, for example, the packet of the object audio may be an MPEG-H audio stream packet. Furthermore, in this case, for example, the transmission unit may transmit the packet of the object audio with being included in a container of ISOBMFF.

In this manner, in the present technology, spatial voice data and information regarding a predetermined number of registered viewpoints are transmitted. Therefore, on the reception side, a voice output corresponding to a fixed position of a wide viewing angle image can be easily obtained.

Note that, in the present technology, for example, the information regarding the predetermined number of registered viewpoints may be grouped. In this manner, by the information being grouped, on the reception side, a voice output corresponding to a fixed position of a wide viewing angle image can be obtained for each intended purpose or each user.

Furthermore, according to another aspect of the present technology, a processing apparatus includes an acquisition unit configured to acquire spatial voice data and information regarding a predetermined number of registered viewpoints, and a processing unit configured to obtain output voice data by processing the spatial voice data on the basis of the information regarding the registered viewpoints.

In the present technology, spatial voice data and information regarding a predetermined number of registered viewpoints are acquired by the acquisition unit. For example, the spatial voice data may be data of scene-based audio. In this case, for example, the data of the scene-based audio may be each component of an HoA format. Then, the processing unit obtains output voice data by processing the spatial voice data on the basis of the information regarding the registered viewpoints. For example, the acquisition unit receives the data of the scene-based audio and the information regarding the predetermined number of registered viewpoints, or acquires the data of the scene-based audio and the information regarding the predetermined number of registered viewpoints by reproducing from a media.

Furthermore, for example, the acquisition unit may acquire the data of the scene-based audio and the information regarding the predetermined number of registered viewpoints from a packet of received object audio. In this case, for example, the packet of the object audio may be an MPEG-H audio stream packet. Furthermore, for example, the acquisition unit may acquire the information regarding the predetermined number of registered viewpoints from a video processing system configured to obtain display image data by processing image data of a wide viewing angle image on the basis of viewpoint information.

In this manner, in the present technology, the data of the scene-based audio and the information regarding the predetermined number of registered viewpoints are acquired, and output voice data is obtained by processing the data of the scene-based audio on the basis of the information regarding the registered viewpoints. Therefore, a voice output corresponding to a fixed position of a wide viewing angle image can be easily obtained.

Note that, in the present technology, for example, the predetermined number of registered viewpoint information may be grouped, and the processing unit may use viewpoint information of a group determined on the basis of an attribute of a user or contractual coverage. In this case, restriction can be performed in such a manner that a voice output corresponding to an attribute of a user or contractual coverage is obtained.

Furthermore, in the present technology, for example, a control unit configured to control user notification of a relationship between a position of a current viewpoint and a position indicated by the information regarding the registered viewpoints may be further included. In this case, the user can easily move the position of the current viewpoint to the position indicated by the information regarding the registered viewpoints.

EFFECTS OF THE INVENTION

According to the present technology, a voice output corresponding to a fixed position of a wide viewing angle image can be easily obtained. Note that the effect described here is not necessarily limited, and may be any effect described in the present disclosure.

BRIEF DESCRIPTION OF DRAWINGS

FIG. 5 is a diagram for describing planar packing for obtaining a projection picture from a spherical surface captured image.

FIG. 6 is a diagram illustrating a structure example of an SPS NAL unit in HEVC encoding.

FIG. 8 is a diagram illustrating a structure example of rendering metadata.

FIG. 9 is a diagram illustrating content of main information in the structure example illustrated in FIG. 8.

FIG. 10 is a diagram for describing each piece of information in the structure example illustrated in FIG. 8.

FIG. 11 is a diagram illustrating a structure example of "video_viewpoint_grid( )".

FIG. 12 is a diagram illustrating content of main information in the structure example illustrated in FIG. 11.

FIG. 13 is a diagram for describing a viewpoint grid being a registered viewpoint.

FIG. 19 is a diagram illustrating a structure example of "audio_viewpoint_grid( )".

FIG. 20 is a diagram illustrating content of main information in the structure example illustrated in FIG. 19.

FIG. 22 is a diagram illustrating a description example of an MPD file corresponding to an MP4 stream.

MODE FOR CARRYING OUT THE INVENTION

Hereinafter, a mode for carrying out the present invention (hereinafter, referred to as an embodiment) will be described. Note that the description will be given in the following order.

1. Embodiment
2. Modified Example

1. Embodiment

Overview of MPEG-DASH-Based Stream Delivery System

First of all, an overview of an MPEG-DASH-based stream delivery system to which the present technology can be applied will be described. Note that delivery may be performed by broadcast or communication. Hereinafter, an example of performing delivery by communication will be mainly described.

Figure 1:
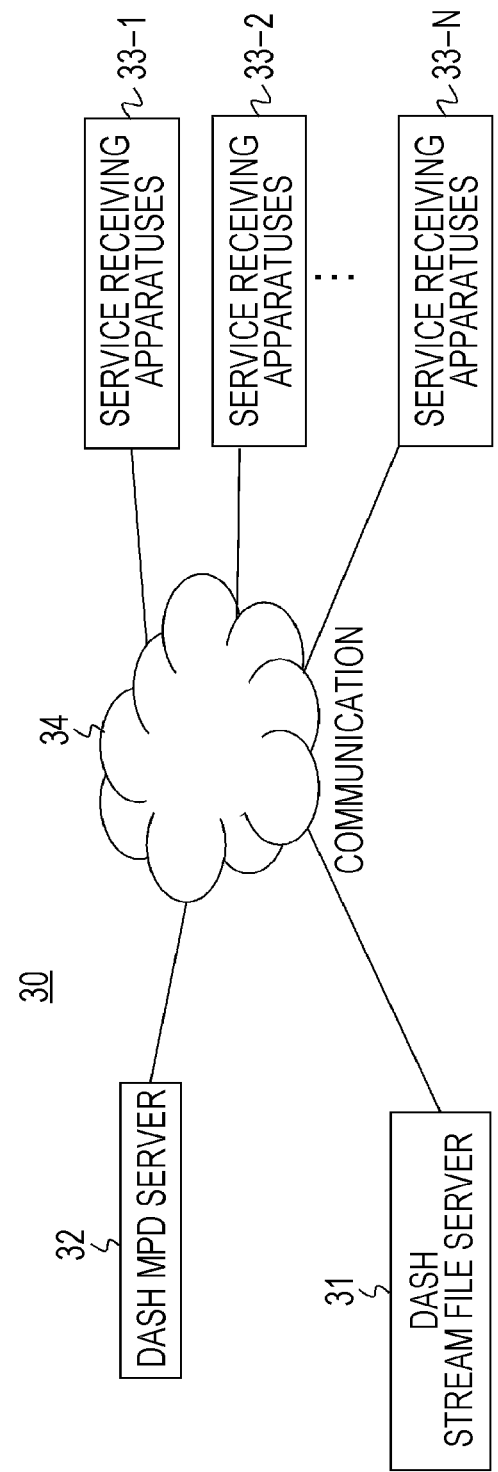
FIG. 1 is a block diagram illustrating a configuration example of an MPEG-DASH-based stream delivery system.

FIG. 1 illustrates a configuration example of an MPEG-DASH-based stream delivery system 30. In the configuration example, a media stream and a Media Presentation description (MPD) file is transmitted through a communication network transmission path (communication transmission path). The stream delivery system 30 has a configuration in which N service receiving apparatuses 33-1, 33-2, . . . , and 33-N are connected to a DASH stream file server 31 and a DASH MPD server 32 via a content delivery network (CDN) 34.

The DASH stream file server 31 generates a stream segment with DASH specification (hereinafter, will be appropriately referred to as "DASH segment") on the basis of media data of predetermined content (video data, audio data, caption data, and the like), and transmits the segment in response to an HTTP demand from a service receiving apparatus. The DASH stream file server 31 may be a server dedicated for streaming. Furthermore, a web server serves as the DASH stream file server 31 in some cases.

Furthermore, in response to a demand for a segment of a predetermined stream that is transmitted from the service receiving apparatuses 33 (33-1, 33-2, . . . , and 33-N) via the CDN 34, the DASH stream file server 31 transmits the segment of the stream to a demand source receiving apparatus via the CDN 34. In this case, referring to a value of a rate described in a Media Presentation description (MPD) file, the service receiving apparatus 33 selects a stream of an optimum rate and performs a demand in accordance with a state of a network environment in which a client is placed.

The DASH MPD server 32 is a server that generates an MPD file for acquiring a DASH segment generated in the DASH stream file server 31. The DASH MPD server 32 generates an MPD file on the basis of content metadata from a content management server (not illustrated), and an address (url) of the segment generated in the DASH stream file server 31. Note that the DASH stream file server 31 and the DASH MPD server 32 may be physically the same.

In the format of MPD, for each stream of a video, an audio, or the like, each attribute is described using an element called representation. For example, in an MPD file, the respective rates are described for a plurality of video data streams with different rates for the respective representations. In the service receiving apparatus 33, referring to the value of the rate, an optimum stream can be selected as described above in accordance with the state of the network environment in which the service receiving apparatus 33 is placed.

Figure 2:
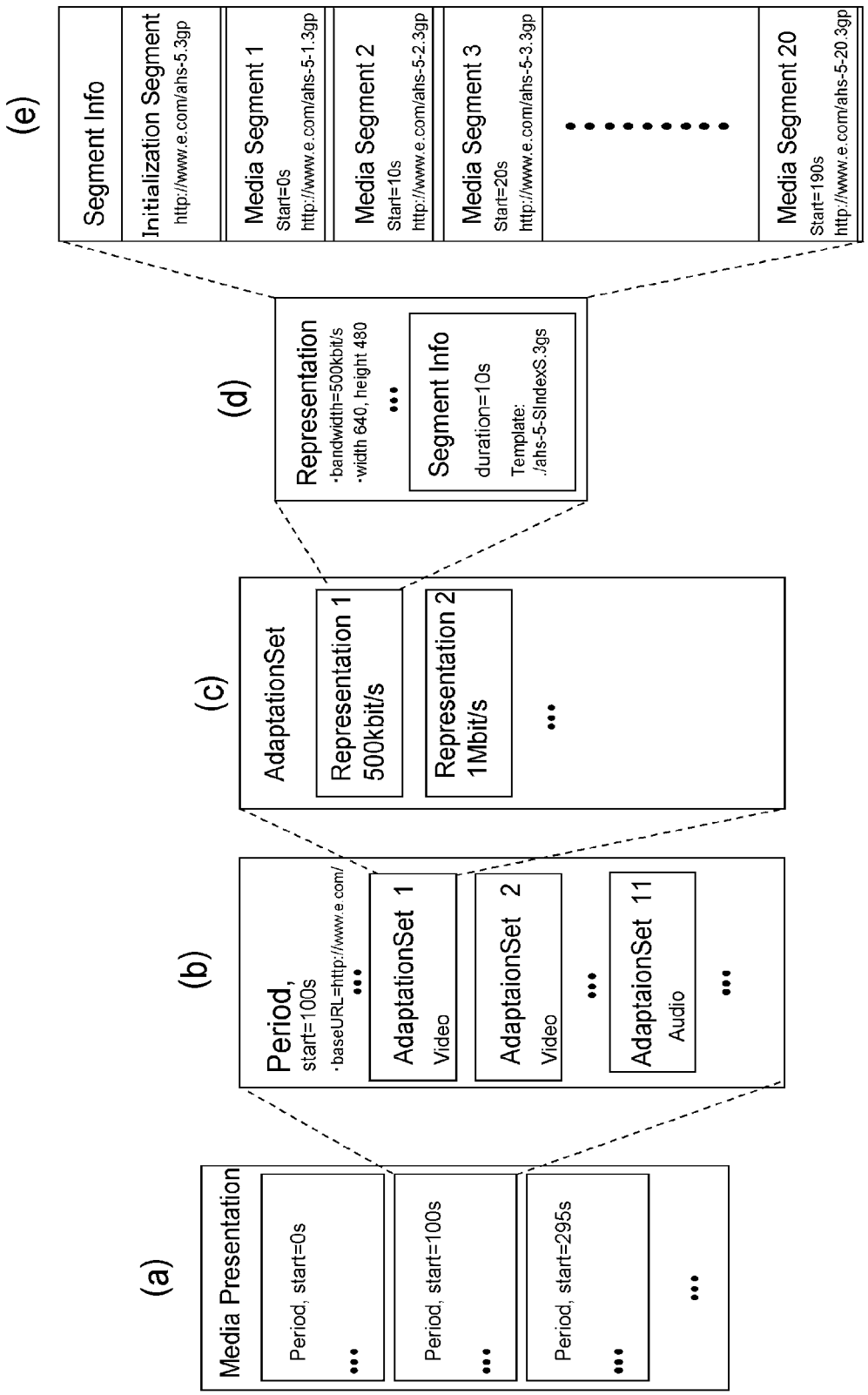
FIG. 2 is a diagram illustrating an example of a relationship between structures hierarchically arranged in an MPD file.

FIG. 2 illustrates an example of a relationship between structures hierarchically arranged in an MPD file. As illustrated in FIG. 2(*a*), a plurality of Periods separated at time intervals exists in Media Presentation serving as the entire MPD file. For example, the first Period starts from zero second, the next Period starts from 100 seconds, and so on.

As illustrated in FIG. 2(*b*), in each Period, a plurality of AdaptationSets exists. Each AdaptationSet depends on a difference in media type such as a video or audio, a difference in language even with the same media type, a difference in observing point, and the like. As illustrated in FIG. 2(*c*), in each AdaptationSet, a plurality of representations exists. Each representation depends on a stream attribute such as a difference in rate, for example.

As illustrated in FIG. 2(*d*), each representation includes SegmentInfo. As illustrated in FIG. 2(*e*), in this SegmentInfo, an Initialization Segment and a plurality of Media Segments in which information of each segment obtained by separating a Period further finely is described exist. In each Media Segment, information regarding an address (url) for actually acquiring segment data such as a video or audio, and the like exist.

Note that the switching of stream can be freely performed between a plurality of representations included in AdaptationSet. Therefore, a stream with an optimum rate can be selected in accordance with the state of a network environment on the reception side, and unintermitted video delivery can be performed.

Configuration Example of Transmission and Reception System

Figure 3:
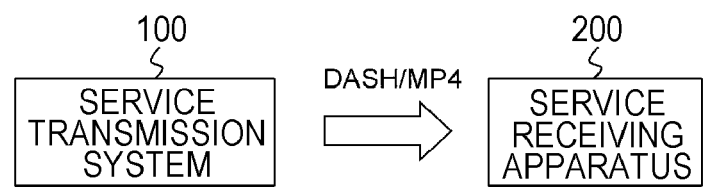
FIG. 3 is a block diagram illustrating a configuration example of a transmission and reception system according to an embodiment.

FIG. 3 illustrates a configuration example of a transmission and reception system 10 according to an embodiment. The transmission and reception system 10 includes a service transmission system 100 and a service receiving apparatus 200. In the transmission and reception system 10, the service transmission system 100 corresponds to the DASH stream file server 31 and the DASH MPD server 32 of the above-described stream delivery system 30 illustrated in FIG. 1. Furthermore, in the transmission and reception system 10, the service receiving apparatus 200 corresponds to the service receiving apparatuses 33 (33-1, 33-2, . . . , 33-N) of the above-described stream delivery system 30 illustrated in FIG. 1.

The service transmission system 100 transmits DASH/MP4, that is, an MPD file serving as a metafile, and an MP4 (ISOBMFF) stream including media stream (Media Segment) such as a video or audio, through a communication network transmission path (refer to FIG. 1).

A video MP4 stream includes a video stream including encoded image data obtained by encoding image data of a wide viewing angle image. Here, a wide viewing angle image is a projection picture obtained by cutting out a part or all of a spherical surface captured image and performing planar packing, but the wide viewing angle image is not limited to this.

Rendering metainformation is inserted into a layer of a video stream and/or a container. By the rendering metainformation being inserted into the layer of the video stream, rendering metainformation can be dynamically changed irrespective of the type of the container. The rendering metainformation includes information regarding a predetermined number of video viewpoints registered with being grouped, and accordingly includes information regarding a predetermined number of grouped video viewpoint grids. The viewpoint indicates a center position of a display image, and a registered viewpoint will be referred to as a "viewpoint grid". Here, information regarding a viewpoint grid includes information regarding an azimuth angle (azimuth information) and an elevation angle (elevation angle information).

Furthermore, an audio MP4 stream includes a packet of an object audio. In this embodiment, an MPEG-H audio stream packet is included. The packet includes data of scene-based audio, a predetermined number of audio viewpoint information pieces registered after grouping, and accordingly includes information regarding a predetermined number of audio_viewpoint_grids. Here, the data of scene-based audio is data generated for reproducing sound to be output when a user faces an arbitrary direction of 360 degrees, on the basis of audio data obtained by collecting sound at a certain one position. The data of the scene-based audio forms spatial voice data for reproducing voice in such a manner that a position from which sound hears changes in accordance with the direction to which the user looks.

Here, information regarding a predetermined number of audio_viewpoint_grids corresponds to the above-described information regarding a predetermined number of video viewpoint grids on one-on-one level, and each information is associated with corresponding information by a viewpoint grid ID. In this case, the information regarding a predetermined number of audio_viewpoint_grids is considered to be basically the same as the information regarding a predetermined number of video viewpoint grids, but a case where the information regarding a predetermined number of audio_viewpoint_grids partially or completely differs from the information regarding a predetermined number of video viewpoint grids can be considered. Note that, in a case where both pieces of information are the same, the insertion of information regarding audio_viewpoint_grids to an MPEG-H audio stream packet can also be omitted.

The service receiving apparatus 200 receives the above-described MP4 (ISOBMFF) stream of a video and audio that are transmitted from the service transmission system 100 through the communication network transmission path (refer to FIG. 1).

The service receiving apparatus 200 obtains display image data by processing image data of a wide viewing angle image that has been obtained by extracting a video stream from a video MP4 stream and decoding the video stream, on the basis of predetermined video viewpoint grid information. For example, the service receiving apparatus 200 obtains display image data in which a center position is set to a predetermined video viewpoint grid selected by a user operation unit from among a predetermined number of video viewpoint grids of a group determined on the basis of an attribute of the user or contractual coverage.

Furthermore, the service receiving apparatus 200 obtains output voice data by processing data of scene-based audio further extracted from an MPEG-H audio stream packet extracted from an audio MP4 stream, on the basis of information regarding a predetermined audio viewpoint grids.

In this case, as described above, audio viewpoint grid information corresponding to information regarding a video viewpoint grid that has been used when the display image data has been obtained is used. Therefore, a voice output interlocked with a display image is obtained. Note that, in a case where information regarding an audio viewpoint grid is not included in an MPEG-H audio stream packet, output voice data is obtained on the basis of information regarding a video viewpoint grid that has been used when the display image data has been obtained. Note that the following description will be given assuming that the MPEG-H audio stream packet includes information regarding an audio viewpoint grid.

Figure 4:
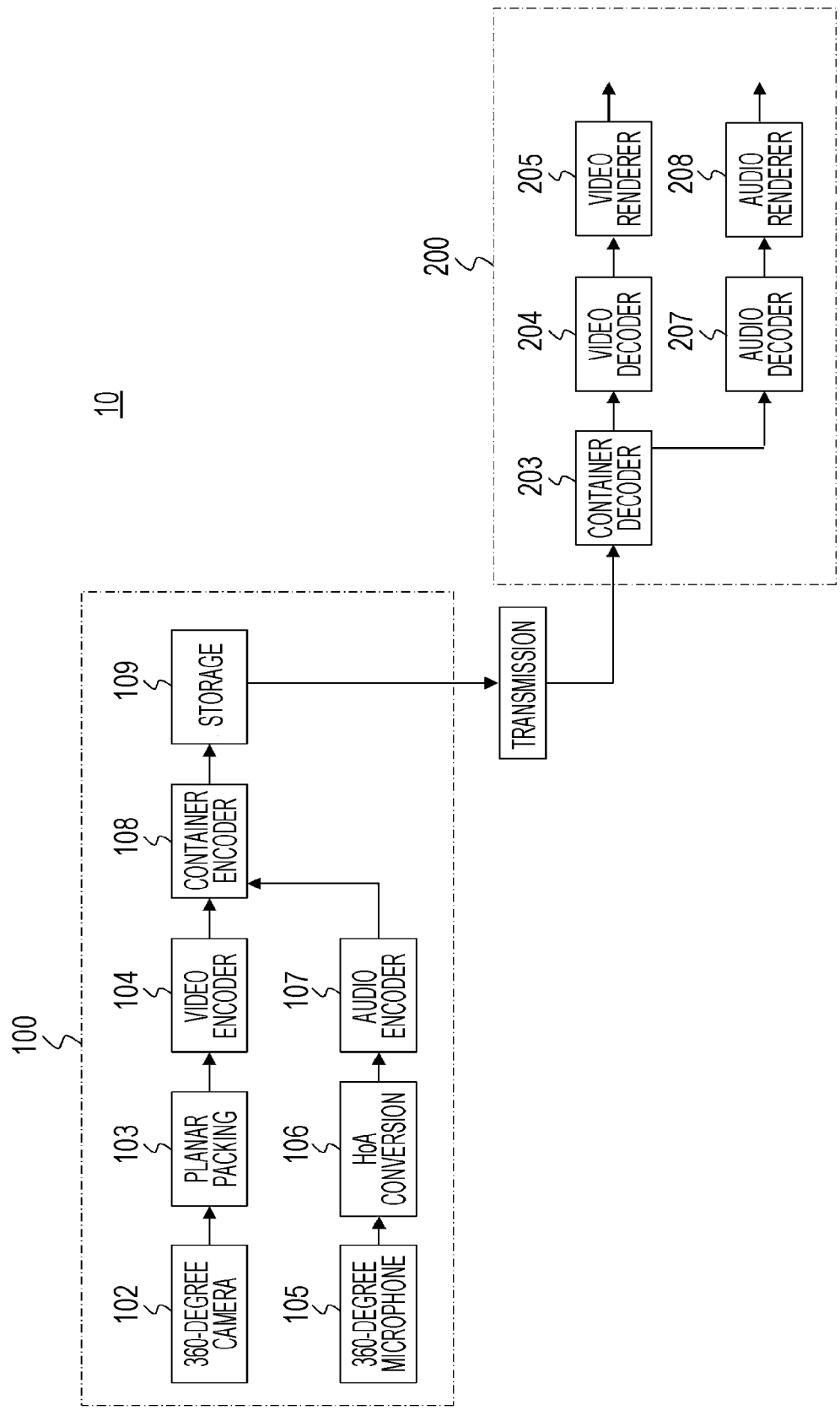
FIG. 4 is a diagram schematically illustrating a configuration example of the entire system of the transmission and reception system.

FIG. 4 schematically illustrated a configuration example of the entire system of the transmission and reception system 10. The service transmission system 100 includes a 360-degree camera 102, a planar packing unit 103, a video encoder 104, a 360-degree microphone 105, an HoA conversion unit 106, an audio encoder 107, a container encoder 108, and a storage 109.

The 360-degree camera 102 captures an image of a subject using a predetermined number of cameras, and obtains a wide viewing angle image. In the embodiment, the 360-degree camera 102 obtains image data of a spherical surface captured image (360° Virtual Reality (VR) image). For example, the 360-degree camera 102 performs image capturing using a Back to Back method, and obtains, as a spherical surface captured image, a super-wide viewing angle front surface image and a super-wide viewing angle back surface image having viewing angles of 180° or more that have been both captured using a fisheye lens.

The planar packing unit 103 obtains a projection picture by cutting out a part or all of a spherical surface captured image obtained by the 360-degree camera 102, and performing planar packing. In this case, as a format type of the projection picture, for example, Equirectangular, Cross-cubic, or the like is selected. Note that, in the planar packing unit 103, scaling is performed on a projection picture as necessary, and a projection picture with predetermined resolution is obtained.

FIG. 5(a) illustrates an example of a super-wide viewing angle front surface image and a super-wide viewing angle back surface image, which serve as a spherical surface captured image obtained by the camera 102. FIG. 5(b) illustrates an example of a projection picture obtained by the planar packing unit 103. This example is an example of a case where a format type of the projection picture is Equirectangular. Furthermore, this example is an example of a case where each image illustrated in FIG. 5(a) is cut out at a latitude indicated by a broken line. FIG. 5(c) illustrates an example of a projection picture on which scaling has been performed.

Referring back to FIG. 4, the video encoder 104 performs encoding such as MPEG4-AVC or HEVC, for example, on image data of a projection picture from the planar packing unit 103, obtains encoded image data, and generates a video stream including the encoded image data.

Cutout position information is inserted into an SPS NAL unit of the video stream. For example, in the HEVC encoding, "conformance_window" corresponds to the cutout position information, and in the MPEG4-AVC encoding, "frame_crop_offset" corresponds to the cutout position information.

FIG. 6 illustrates a structure example (Syntax) of an SPS NAL unit in HEVC encoding. A field of "pic_width_in_luma_samples" indicates resolution (pixel size) in a horizontal direction of a projection picture. A field of "pic_height_in_luma_samples" indicates resolution (pixel size) in a vertical direction of a projection picture. Then, when "conformance_window_flag" is set, cutout position information exists. The cutout position information is regarded as offset information in which a base point (0,0) is set at the top left of the projection picture.

A field of "conf_win_left_offset" indicates a left end position of a cutout position. A field of "conf_win_right_offset" indicates a right end position of a cutout position. A field of "conf_win_top_offset" indicates an upper end position of a cutout position. A field of "conf_win_bottom_offset" indicates a lower end position of a cutout position.

In this embodiment, the center of the cutout position indicated by this cutout position information is set to coincide with a reference point of the projection picture. Here, when the center of a cutout position is denoted by O (p,q), p and q can be respectively represented by the following formulae.

Figure 7:
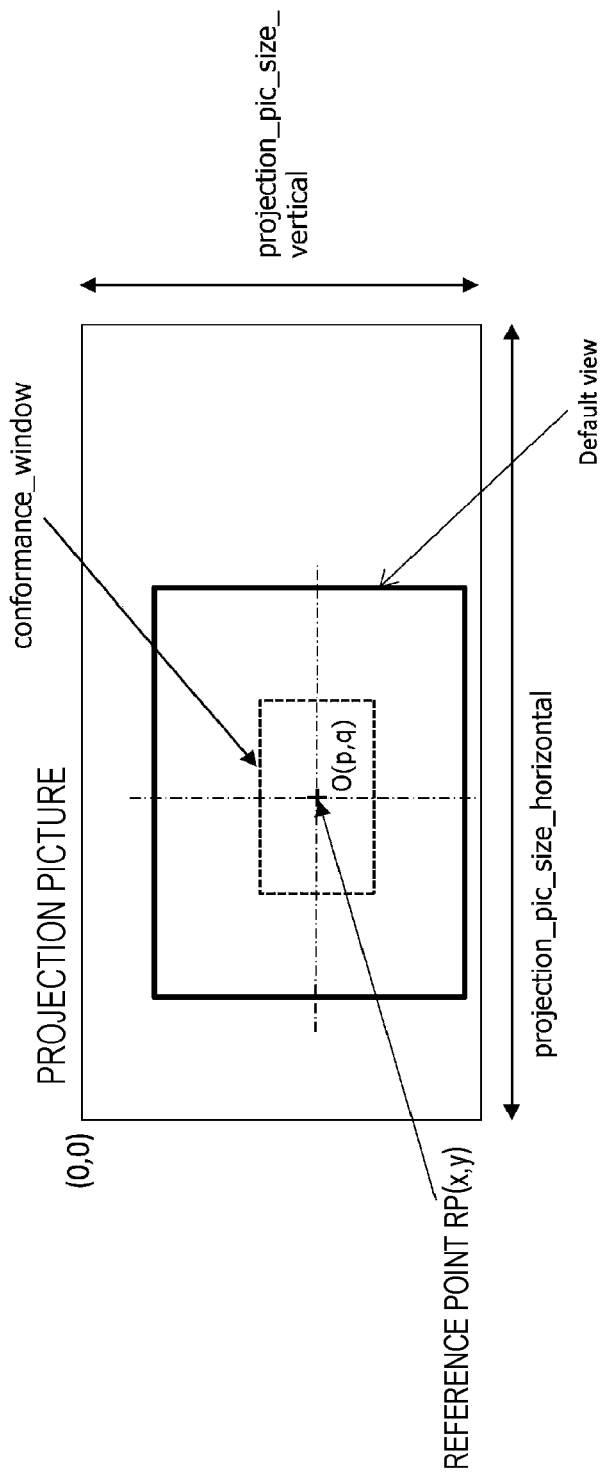
FIG. 7 is a diagram for describing causing a center O (p,q) of a cutout position to coincide with a reference point RP (x,y) of a projection picture.

$p = (\text{conf\_win\_right\_offset} - \text{conf\_win\_left\_offset}) * \frac{1}{2}$ $+ \text{conf\_win\_left\_offset}$ $q = (\text{conf\_win\_bottom\_offset} - \text{conf\_win\_top\_offset}) * \frac{1}{2}$ $+ \text{conf\_win\_top\_offset}$ FIG. 7 illustrates causing the center O (p,q) of the cutout position to coincide with a reference point RP (x,y) of a projection picture. In the example illustrated in the drawing, "projection_pic_size_horizontal" indicates a horizontal pixel size of the projection picture, and "projection_pic_size_vertical" indicates a vertical pixel size of the projection picture. Note that, in a VR supporting terminal equipped with an HMD, a display view (display image) can be obtained by rendering a projection picture, but a default view is centered on the reference point RP (x,y).

In this case, for example, when a projection picture includes a plurality of regions including a default region a center position of which corresponds to the reference point RP (x,y), a position indicated by cutout position information is set to coincide with the position of the default region. In this case, the center O (p,q) of the cutout position indicated by cutout position information coincides with the reference point RP (x,y) of the projection picture.

Referring back to FIG. 4, the video encoder 104 inserts an SEI message having rendering metadata, into a portion of "SEIs" of an access unit (AU). FIG. 8 illustrates a structure example (Syntax) of rendering metadata (Rendering_metadata). FIG. 9 illustrates content (Semantics) of main information in the structure example.

A 16-bit field of "rendering_metadata_id" is an ID for identifying a rendering metadata structure. A 16-bit field of "rendering_metadata_length" indicates a byte size of a rendering metadata structure.

The respective 16-bit fields of "start_offset_sphere_latitude", "start_offset_sphere_longitude", "end_offset_sphere_latitude", and "end_offset_sphere_longitude" indicate information indicating a cutout range in the case of performing planar packing of a spherical surface captured image (refer to FIG. 10(a)). A field of "start_offset_sphere_latitude" indicates a latitude (vertical direction) of a cutout start offset from a spherical surface. A field of "start_offset_sphere_longitude" indicates a longitude (horizontal direction) of a cutout start offset from a spherical surface. A field of "end_offset_sphere_latitude" indicates a latitude (vertical direction) of a cutout end offset from a spherical surface. A field of "end_offset_sphere_longitude" indicates a longitude (horizontal direction) of a cutout end offset from a spherical surface.

The respective 16-bit fields of "projection_pic_size_horizontal" and "projection_pic_size_vertical" indicate size information of a projection picture (refer to FIG. 10(b)). A field of "projection_pic_size_horizontal" indicates a horizontal pixel count from the top-left in the size of the projection picture. A field of "projection_pic_size_vertical" indicates a vertical pixel count from the top-left in the size of the projection picture.

The respective 16-bit fields of "scaling_ratio_horizontal" and "scaling_ratio_vertical" indicate scaling ratios from the original size of a projection picture (refer to FIGS. 5(b) and (c)). A field of "scaling_ratio_horizontal" indicates a horizontal scaling ratio from the original size of a projection picture. A field of "scaling_ratio_vertical" indicates a vertical scaling ratio from the original size of a projection picture.

The respective 16-bit fields of "reference_point_horizontal" and "reference_point_vertical" indicate position information of the reference point RP (x,y) of the projection picture (refer to FIG. 10(b)). A field of "reference_point_horizontal" indicates a horizontal pixel position "x" of the reference point RP (x,y). A field of "reference_point_vertical" indicates a vertical pixel position "y" of the reference point RP (x,y).

5-bit field of "format_type" indicates a format type of the projection picture. For example, "0" indicates Equirectangular, "1" indicates Cross-cubic, and "2" indicates partitioned cross cubic.

1-bit field of "backwardcompatible" indicates whether or not a backward compatible setting is made, that is, the center O (p,q) of the cutout position indicated by the cutout position information inserted to the layer of the video stream is set to coincide with the reference point RP (x,y) of the projection picture (refer to FIG. 7). For example, "0" indicates that a backward compatible setting is not made, and "1" indicates that a backward compatible setting is made. "video_viewpoint_grid( )" is a field storing information regarding a grouped viewpoint grid.

FIG. 11 illustrates a structure example (Syntax) of "video_viewpoint_grid( )". FIG. 12 illustrates content (Semantics) of main information in the structure example. 16-bit field of "initial_viewpoint_grid_center_azimuth" indicates an azimuth angle of an initial (default) viewpoint position by offset from a reference point. 16-bit field of "initial_viewpoint_grid_center_elevation" indicates an elevation angle of an initial (default) viewpoint position by offset from a reference point.

8-bit field of "number_of_group" indicates the number of groups. The following field is repeated by this number of times. 8-bit field of "group_id" indicates a group ID. 8-bit field of "category" indicates a category (classification type) of a group.

8-bit field of "number_of_viewpoint_grids" indicates the number of viewpoint grids (viewpoint_grid). The following field is repeated by this number of times. 8-bit field of "viewpoint_grid_id" indicates an ID of a viewpoint grid. 8-bit field of "sub_category" indicates a category in a group of a viewpoint grid.

16-bit field of "video_center_azimuth" indicates an azimuth angle (azimuth information) of a viewpoint grid. 16-bit field of "video_center_elevation" indicates an elevation angle (elevation angle information) of a viewpoint grid.

Here, a viewpoint grid will be described. FIG. 13(a) illustrates a planarly-converted image. This image is enclosed by a landscape-oriented rectangle, and is obtained by performing conversion processing of the above-described projection picture in such a manner that a distorted portion is corrected to become a proper image.

In the example illustrated in the drawing, eight viewpoints VpA to VpH are registered as viewpoint grids in this planarly-converted image (wide viewing angle image). Note that the above description has been given assuming that the position of each viewpoint grid is identified on the basis of an azimuth angle (azimuth information) and an elevation angle (elevation angle information). However, the position (coordinate value) of each viewpoint grid can also be represented by pixel offset from the reference point RP (x,y) (refer to FIG. 7). As illustrated in FIG. 13(b), on the reception side, by selecting a desired viewpoint grid from among the respective viewpoint grids identified by A to H viewpoint grid IDs, an image having the center position corresponding to the viewpoint grid can be displayed.

Figure 14:
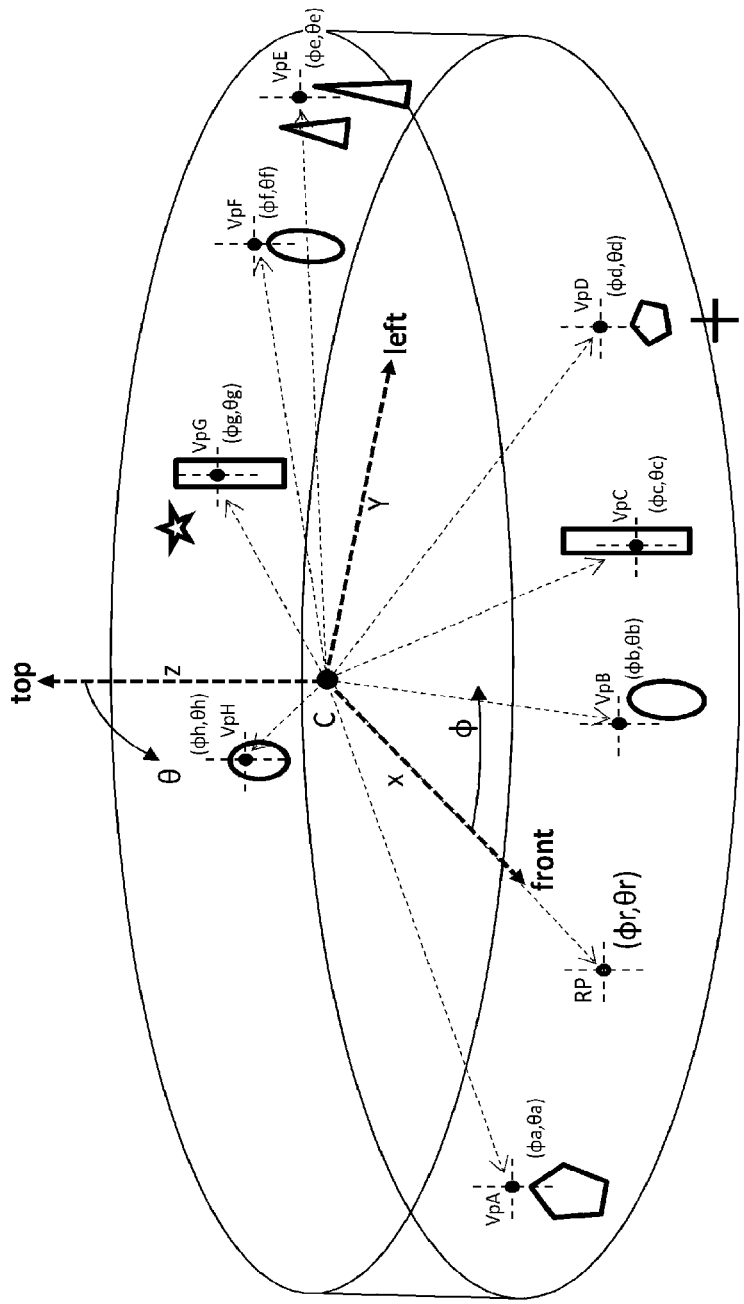
FIG. 14 is a diagram for describing a position of a viewpoint grid.

FIG. 14 illustrates a part of a spherical surface image corresponding to the planarly-converted image in FIG. 13(a). "C" indicates a center position corresponding to a viewing position. In the example illustrated in the drawings, azimuth angles φ and elevation angles θ of the respective positions corresponding to the eight viewpoint grids VpA to VpH are illustrated. Here, an azimuth angle φ and an elevation angle θ each indicate an angle in an arrow direction, and an angle of a base point position of an arrow is 0 degree. For example, as in the example illustrated in the drawing, the azimuth angle φ of the reference point (RP) is set to φr=0°, and the elevation angle θ of the reference point (RP) is set to θr=90°(π/2).

Figure 15:
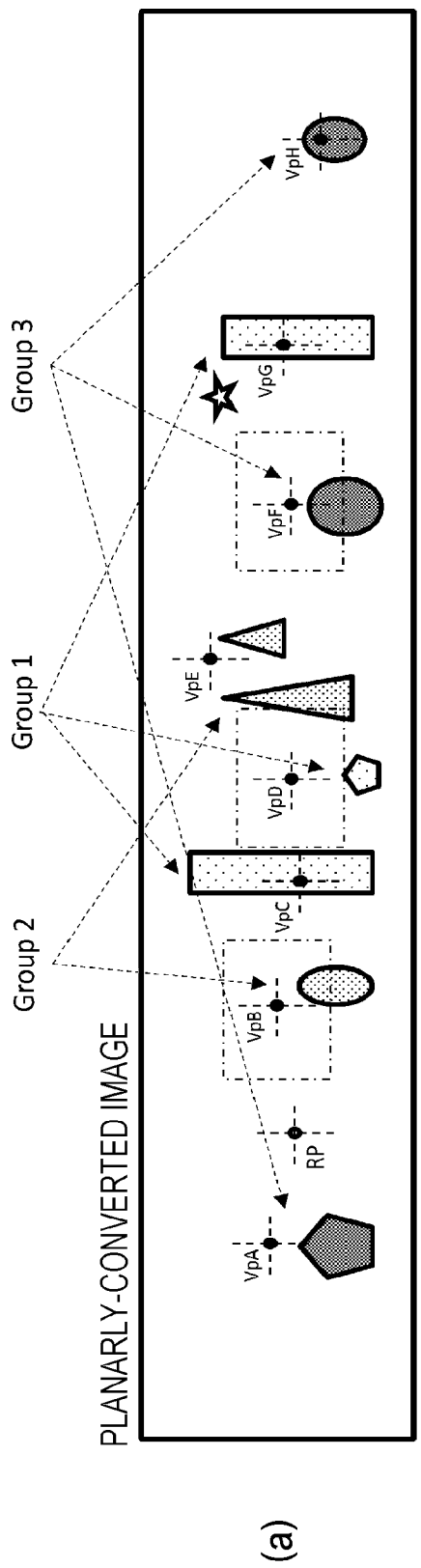
FIG. 15 is a diagram for describing an example of grouping of a viewpoint grid by category.

FIG. 15(a) illustrates an example of grouping of a viewpoint grid by category. In the example illustrated in the drawing, a group 1 includes three viewpoint grids VpC, VpD, and VpG. Furthermore, a group 2 includes two viewpoint grids VpB and VpE. Furthermore, a group 3 includes three viewpoint grids VpA, VpF, and VpH. FIG. 15(b) illustrates a list of categories and viewpoint grid IDs classified by group ID in the example in FIG. 15(a).

Figure 16:
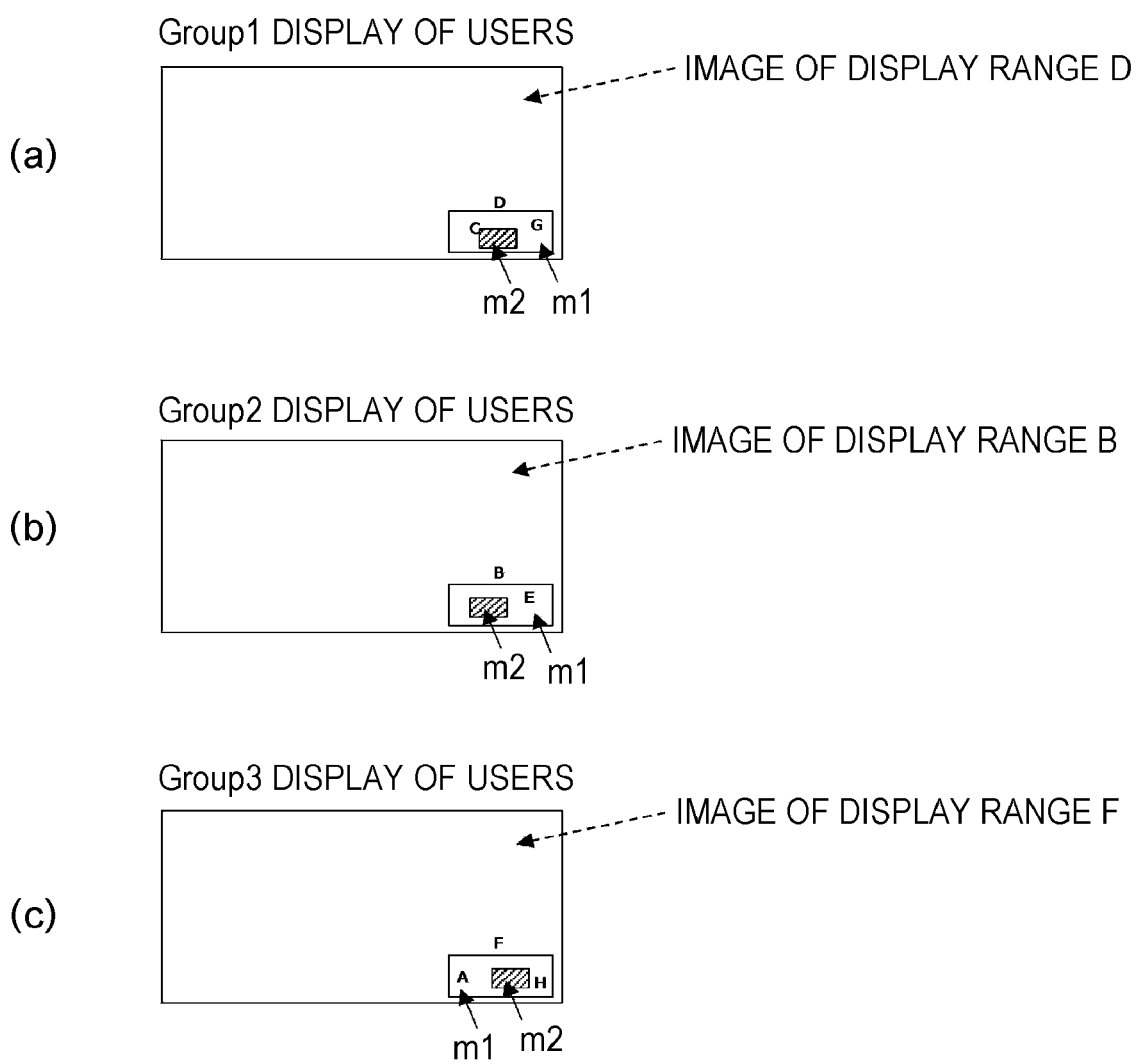
FIG. 16 is a diagram illustrating a display example of users of groups 1 to 3 in the grouping illustrated in FIG. 15.

FIG. 16(a) illustrates an example of display of users in the group 1. Here, as described later, the users of the group 1 refer to users allowed to use the viewpoint grids included in the group 1, on the basis of attributes of the users or contractual coverage. The same applies to the users of other groups. The same applies in another example.

The example illustrated in the drawing illustrates a state in which the viewpoint grid VpD is selected by a user operation, and an image having the center position corresponding to the viewpoint grid VpD (image of display range D, refer to a dashed-dotted line frame corresponding to the viewpoint grid VpD illustrated in FIG. 15(a)) is displayed as a main image. Then, in the example illustrated in the drawing, a UI image is displayed at the lower right position with being superimposed in this main image. In this UI image, a rectangular region m1 indicating the range of the entire image is illustrated, and a rectangular region m2 indicating a current display range is illustrated in this rectangular region m1. Furthermore, in this UI image, it is indicated that an ID of a viewpoint grid corresponding to the current display range is "D", and "C" and "C" indicating IDs of selectable viewpoint grids are further displayed at corresponding positions in the rectangular region m1.

FIG. 16(b) illustrates an example of display of users in the group 2. The example illustrated in the drawing illustrates a state in which the viewpoint grid VpB is selected by a user operation, and an image having the center position corresponding to the viewpoint grid VpB (image of display range B, refer to a dashed-dotted line frame corresponding to the viewpoint grid VpB illustrated in FIG. 15(a)) is displayed as a main image. Then, in the example illustrated in the drawing, a UI image is displayed at the lower right position with being superimposed in this main image. In this UI image, a rectangular region m1 indicating the range of the entire image is illustrated, and a rectangular region m2 indicating a current display range is illustrated in this rectangular region m1. Furthermore, in this UI image, it is indicated that an ID of a viewpoint grid corresponding to the current display range is "B", and "E" indicating an ID of a selectable viewpoint grid is further displayed at a corresponding position in the rectangular region m1.

FIG. 16(c) illustrates an example of display of users in the group 3. The example illustrated in the drawing illustrates a state in which the viewpoint grid VpF is selected by a user operation, and an image having the center position corresponding to the viewpoint grid VpF (image of display range F, refer to a dashed-dotted line frame corresponding to the viewpoint grid VpF illustrated in FIG. 15(a)) is displayed as a main image. Then, in the example illustrated in the drawing, a UI image is displayed at the lower right position with being superimposed in this main image. In this UI image, a rectangular region m1 indicating the range of the entire image is illustrated, and a rectangular region m2 indicating a current display range is illustrated in this rectangular region m1. Furthermore, in this UI image, it is indicated that an ID of a viewpoint grid corresponding to the current display range is "F", and "A" and "H" indicating IDs of selectable viewpoint grids are further displayed at corresponding positions in the rectangular region m1.

Figure 17:
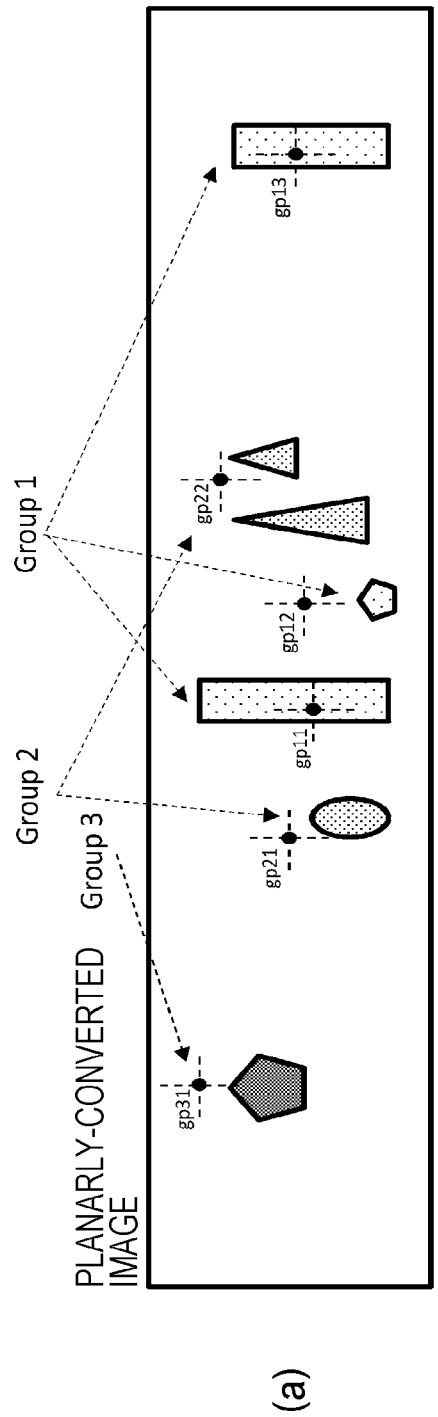
FIG. 17 is a diagram illustrating a specific example of a category and a subcategory of a viewpoint grid.

FIG. 17(a) illustrates an example of grouping of a viewpoint grid by category. In the example illustrated in the drawing, a group 1 includes three viewpoint grids gp11, gp12, and gp13. Furthermore, a group 2 includes two viewpoint grids gp21 and gp22. Furthermore, a group 3 includes one viewpoint grid gp31.

FIG. 17(b) illustrates a category corresponding to each portion loop, and further illustrates a specific example of a subcategory corresponding to each viewpoint grid in a group, when a performance image of an orchestra is targeted. In the example illustrated in the drawing, categories of the group 1 correspond to stringed instrument, categories of the group 2 correspond to wind instrument, and a category of the group 3 corresponds to percussion instrument.

Then, subcategories of the viewpoints grid gp11, gp12, and gp13 of the group 1 respectively correspond to violin, viola, and contrabass. Furthermore, subcategories of the viewpoints grid gp21 and gp22 of the group 2 respectively correspond to flute and trumpet. Moreover, furthermore, a subcategory of the viewpoint grid gp31 of the group 3 is timpani.

Referring back to FIG. 4, the 360-degree microphone 105 is a microphone that collects sound from 360° all directions. In this embodiment, the 360-degree microphone 105 is an Ambisonic microphone. As conventionally known, the Ambisonic microphone includes four or more microphones such as four microphone capsules disposed outward on the respective surfaces of a regular tetragon, for example. Here, each microphone capsule basically has unidirectionality.

A Higher Order Ambisonics (HOA) conversion unit 106 obtains each component of an HoA format (hereinafter, referred to as an "HoA component") as data of scene-based audio by resolving four voice signals (acoustic signal) obtained by collecting sound by the four microphone capsules of the 360-degree microphone 105, for example, into orthogonal components having different cycles on the spherical surface. In this embodiment, in the HoA conversion unit 106, voice signals obtained by collecting sound by the four microphone capsules are converted into signal representation in a case where sound is collected with four sound collection directional characteristics of a zero order and a first order. In this case, the zero order corresponds to a case where sound is collected by an omnidirectional microphone, and the first order corresponds to a case where sound is collected by a bidirectional microphone in X, Y, and Z axis directions that are orthogonal to each other.

Here, when voice signals obtained by collecting sound by four microphone capsules are denoted by Lb, Lf, Rb, and Rf, HoA components "W, X, Y, and Z" are obtained by the following formula (1). Here, W denotes an omnidirectional component, and X, Y, and Z denote directional components in the respective axis directions.

[Math. 1]

$$\begin{bmatrix} W \\ X \\ Y \\ Z \end{bmatrix} = \begin{bmatrix} 1 & -1 & -1 & 1 \\ -1 & 1 & -1 & 1 \\ 1 & 1 & -1 & -1 \\ -1 & 1 & 1 & -1 \end{bmatrix} \begin{bmatrix} Lb \\ Lf \\ Rb \\ Rf \end{bmatrix} \quad (1)$$

The audio encoder 107 includes the HoA components "W, X, Y, and Z" obtained by the HOA conversion unit 106, and information regarding a predetermined number of viewpoint grids, into a packet of object audio. In this embodiment, in the audio encoder 107, encoding of MPEG-H 3D Audio is performed, and the packet of object audio is turned into an MPEG-H audio stream packet.

Figure 18:
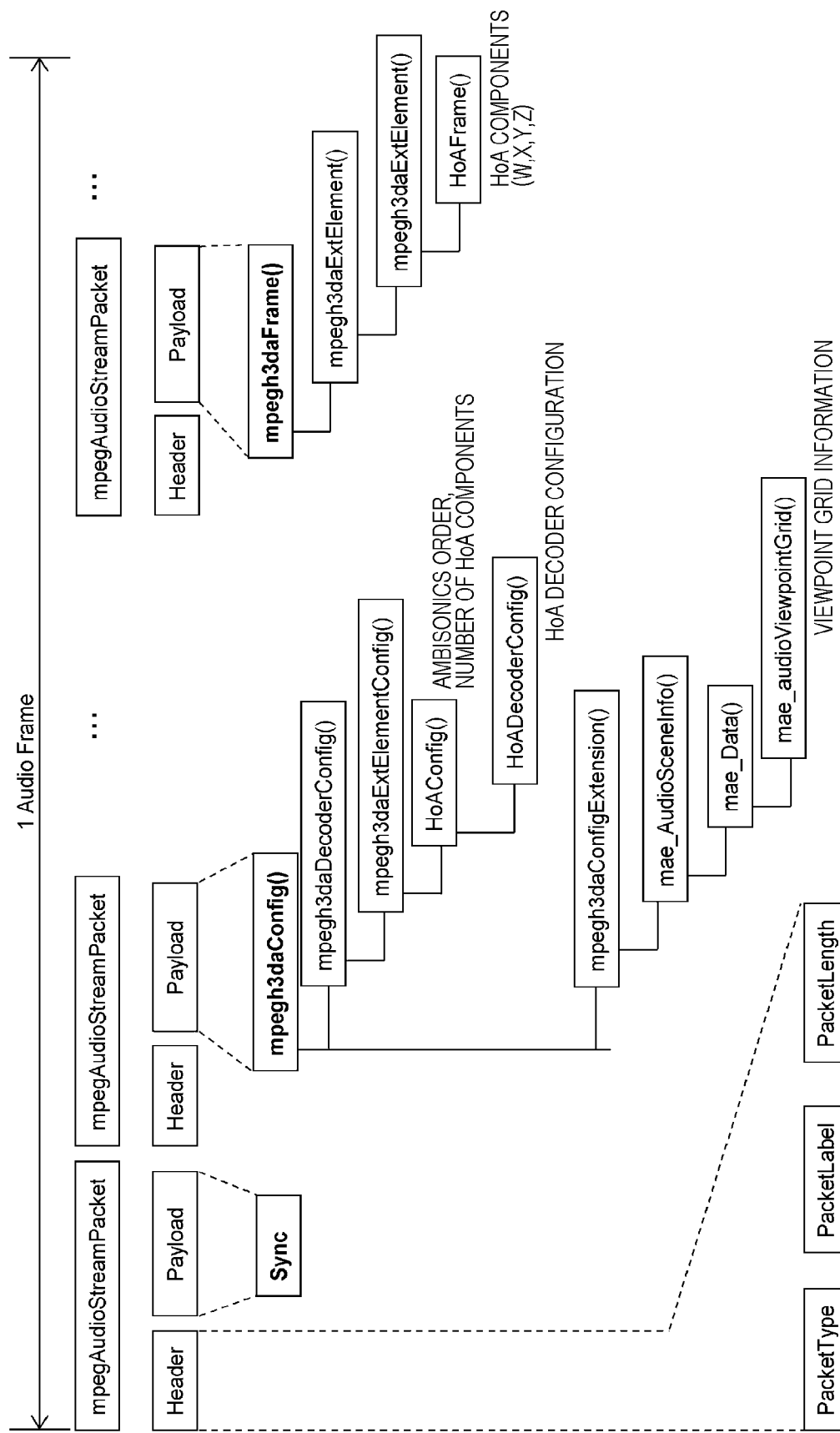
FIG. 18 is a diagram illustrating a structure example of an audio frame in transmission data of MPEG-H 3D Audio.

FIG. 18 illustrates a structure example of an audio frame in transmission data of MPEG-H 3D Audio. This audio frame includes a plurality of MPEG Audio Stream Packets. Each MPEG audio stream packet includes a Header and a Payload.

The Header includes information such as a Packet Type, a Packet Label, and a Packet Length. In the Payload, information defined by a packet type of the Header is arranged. In Payload information, "Sync" corresponding to a synchronization start code, "mpegh3daFrame( )" being actual data of transmission data of 3D audio, or "mpegh3daConfig( )" indicating a configuration and the like of this "mpegh3daFrame( )" exists.

In this embodiment, "mpegh3daDecoderConfig( )" is arranged in "mpegh3daConfig( )", and "mpegh3daExtElementConfig( )", "HoAConfig( )", and "HoADecoderConfig( )" are sequentially arranged hierarchically in this "mpegh3daDecoderConfig( )". Then, "HoAConfig( )" includes information such as an Ambisonics order and the number of HoA components, and "HoADecoderConfig( )" includes information regarding an HoA decoder configuration.

Furthermore, "mpegh3daExtElement( )" is arranged in "mpegh3daFrame( )", and "mpegh3daExtElement( )" and "HoAFrame( )" are sequentially arranged hierarchically in this "mpegh3daExtElement( )". Then, "HoAFrame( )" includes an HoA component serving as data of scene-based audio.

Furthermore, "mpegh3daConfigExtension( )" is arranged in "mpegh3daConfig( )", and "mae_AudioSceneInfo( )", "mae_Data( )", and "mae_AudioViewpointGrid( )" are sequentially hierarchically arranged in this "mpegh3daConfigExtension( )". "mae_AudioViewpointGrid( )" is a field storing information regarding a grouped viewpoint grid. Note that "mae_AudioViewpointGrid( )" corresponds to "audio_viewpoint_grid( )" (refer to FIG. 19).

FIG. 19 illustrates a structure example (Syntax) of "audio_viewpoint_grid( )". FIG. 20 illustrates content (Semantics) of main information in the structure example. 16-bit field of "initial_viewpoint_grid_center_azimuth" indicates an azimuth angle of an initial (default) viewpoint position by offset from a reference point. 16-bit field of "initial_viewpoint_grid_center_elevation" indicates an elevation angle of an initial (default) viewpoint position by offset from a reference point.

8-bit field of "number_of_group" indicates the number of groups. The following field is repeated by this number of times. 8-bit field of "group_id" indicates a group ID. 8-bit field of "category" indicates a category (classification type) of a group.

8-bit field of "number_of_viewpoint_grids" indicates the number of viewpoint grids (viewpoint grid). The following field is repeated by this number of times. 8-bit field of "viewpoint_grid_id" indicates an ID of a viewpoint grid. 8-bit field of "sub_category" indicates a category in a group of a viewpoint grid.

16-bit field of "audio_center_azimuth" indicates an azimuth angle (azimuth information) of a viewpoint grid. 16-bit field of "audio_center_elevation" indicates an elevation angle (elevation angle information) of a viewpoint grid.

Referring back to FIG. 4, the container encoder 108 generates a container including a video stream obtained by the video encoder 104, and an audio stream obtained by the audio encoder 107. In this embodiment, the container encoder 108 generates an MP4 stream as a delivery stream. In this case, regarding a video, rendering metadata (refer to FIG. 8) is inserted also into a layer of the container in addition to the layer of the video stream. Note that the rendering metadata is considered to be inserted only into either one.

Figure 21:
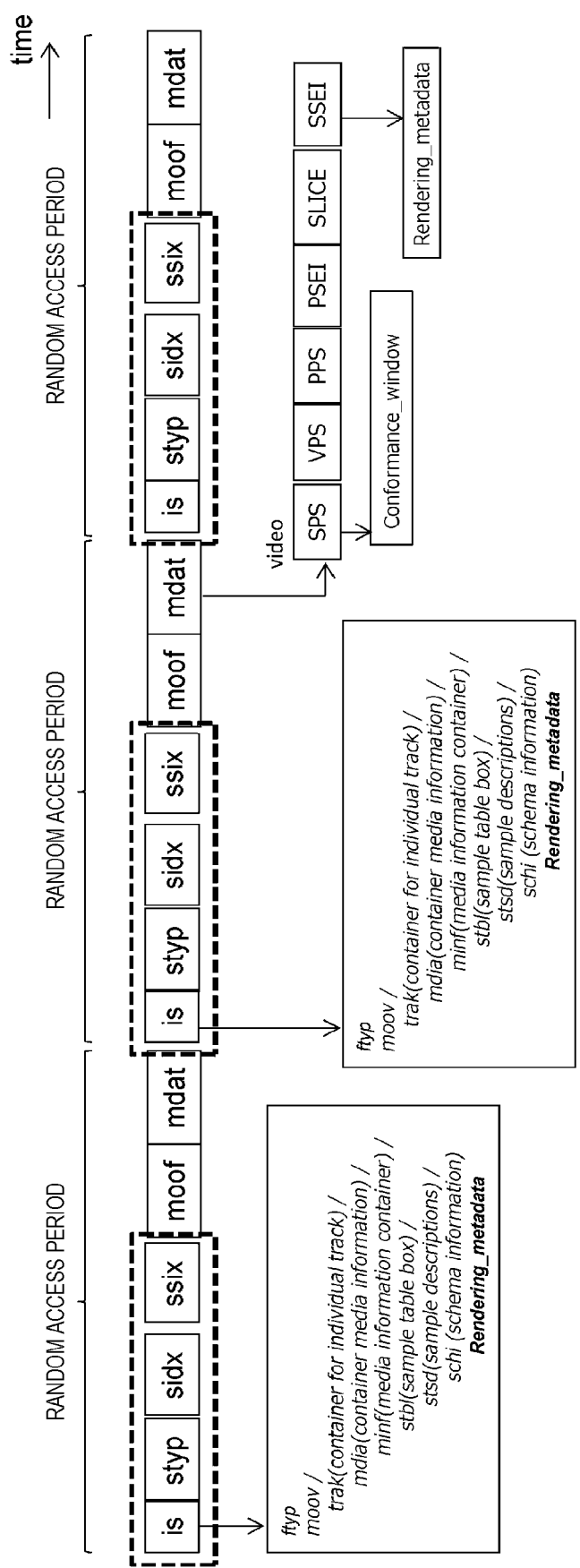
FIG. 21 is a diagram illustrating an example of a video MP4 stream serving as a delivery stream.

FIG. 21 illustrates an example of a video MP4 stream. The entire service stream is fragmented and transmitted. Each random access period has a configuration starting from an Initialization Segment (IS) followed by boxes of "styp", "Segment index box (sidx)", "Sub-segment index box (ssix)", "Movie fragment box (moof)", and "Media data box (mdat)".

The Initialization Segment (IS) has a Box structure that is based on an ISO Base Media File Format (ISOBMFF). At the top, an "ftyp" box indicating a File type is arranged, and an "moov" box for control is subsequently arranged. A "trak" box, an "mdia" box, an "minf" box, an "stbl" box, an "stsd" box, and an "schi" box are hierarchically arranged in this "moov" box, and rendering metadata (Rendering_metadata) (refer to FIG. 8) is inserted into this "schi" box, the detailed description of which will be omitted.

Segment type information is inserted into the "styp" box. Range information of each track is inserted into the "sidx" box, the position of "moof"/"mdat" is indicated, and the position of each sample (picture) in "mdat" is also indicated. Segmentation information of a track is inserted into the "ssix" box, and the segmentation of I/P/B type is performed.

Control information is inserted into the "moof" box. An actual object itself of a signal (transmission media) of a video, audio, and the like are inserted into the "mdat". The "moof" box and the "mdat" box form a Movie fragment. Because a fragment obtained by fragmenting a transmission media is inserted into the "mdat" box of one Movie fragment, control information inserted into the "moof" box becomes control information regarding the fragment.

In the "mdat" box of each Movie fragment, a predetermined number of encoded image data (access unit) of the projection picture is arranged. The predetermined number corresponds to a predetermined number of pictures, and is a number corresponding to one GOP, for example. Here, each access unit includes an NAL unit such as "VPS", "SPS", "PPS", "PSEI", "SLICE", or "SSEI". Note that "VPS" or "SPS" is inserted only into the beginning picture of GOP, for example.

Information regarding "conformance_window" serving as cutout position information is inserted into an SPS NAL unit (refer to FIG. 6). Furthermore, an SEI message having rendering metadata (Rendering_metadata) (refer to FIG. 8) is inserted as an NAL unit of "SSEI".

Referring back to FIG. 4, the MP4 streams of the video and audio that have been generated by the container encoder 108 are transmitted to the service receiving apparatus 200 via the storage 109. FIG. 22 is a diagram illustrating a description example of an MPD file corresponding to these MP4 streams.

In this MPD file, AdaptationSet corresponding to the video MP4 stream exists.

In this AdaptationSet, by the description of "<AdaptationSet mimeType="video/mp4" codecs="hev1.xx.xx.Lxxx,xx,hev1.yy.yy.Lxxx,yy">"", AdaptationSet corresponding to the video stream exists, and it is indicated that the video stream is supplied in an MP4 file structure, and has been subjected to HEVC encoding.

In this AdaptationSet, Representation exists. In this representation, by the description of "<SupplementaryDescriptor schemeIdUri="urn:brdcst:video:vrviewgrid" value="1"/>", the existence of information regarding a viewpoint grid is indicated.

Furthermore, in this representation, by the description of "width="3840"height="2160"frameRate="60"", "codecs="hev1.xx.xx.L153,xx"", "level="0"", resolution, a frame rate, and a codec type are indicated, and it is further indicated that a level "0" is allocated as tag information. Furthermore, by the description of "<BaseURL>videostreamVR.mp4</BaseURL>", a location destination of this MP4 stream is indicated as "videostreamVR.mp4".

In this MPD file, AdaptationSet corresponding to the audio MP4 stream further exists.

In this AdaptationSet, by the description of "<AdaptationSet mimeType="audio/mp4" codecs="mpegh.xx.xx.xx, xx">", AdaptationSet corresponding to the audio stream exists, and it is indicated that the audio stream is supplied in an MP4 file structure, and has been subjected to MPEGH encoding.

In this AdaptationSet, Representation exists. In this representation, by the description of "<SupplementaryDescriptor schemeIdUri="urn:brdcst:audio:vrviewgrid" value="1"/>", the existence of information regarding a viewpoint grid is indicated. Furthermore, by the description of "<BaseURL>audiostreamVR.mp4</BaseURL>", a location destination of this MP4 stream is indicated as "audiostreamVR.mp4".

Referring back to FIG. 4, the service receiving apparatus 200 includes a container decoder 203, a video decoder 204, a video renderer 205, an audio decoder 207, and an audio renderer 208.

The container decoder 203 extracts a video stream from the MP4 stream of the video that has been transmitted from the service transmission system 100, and transmits the video stream to the video decoder 204. The video decoder 204 obtains a projection picture (image data) by performing decoding processing on the video stream. The video renderer 205 obtains a rendering image (image data) by performing rendering processing on the projection picture (image data).

In this case, when a user selects a predetermined viewpoint grid from the group determined on the basis of the attribute of the user or contractual coverage, the video renderer 205 obtains display image data having the center position corresponding to the viewpoint grid. At this time, on the basis of the UI image (refer to FIG. 16) superimposed on the main image, the user can recognize a current display range in the range m1 of the entire image, and furthermore, can recognize a viewpoint grid further selectable by itself. On the basis of this recognition, the user can select an arbitrary viewpoint grid and switch a display image.

Note that, after the user selects an arbitrary viewpoint grid and switch a display image, the user can also shift the center position of the display image from the position of the viewpoint grid. The user can select a viewpoint grid and can further shift the center position of the display image in the following manner, for example.

Figure 23:
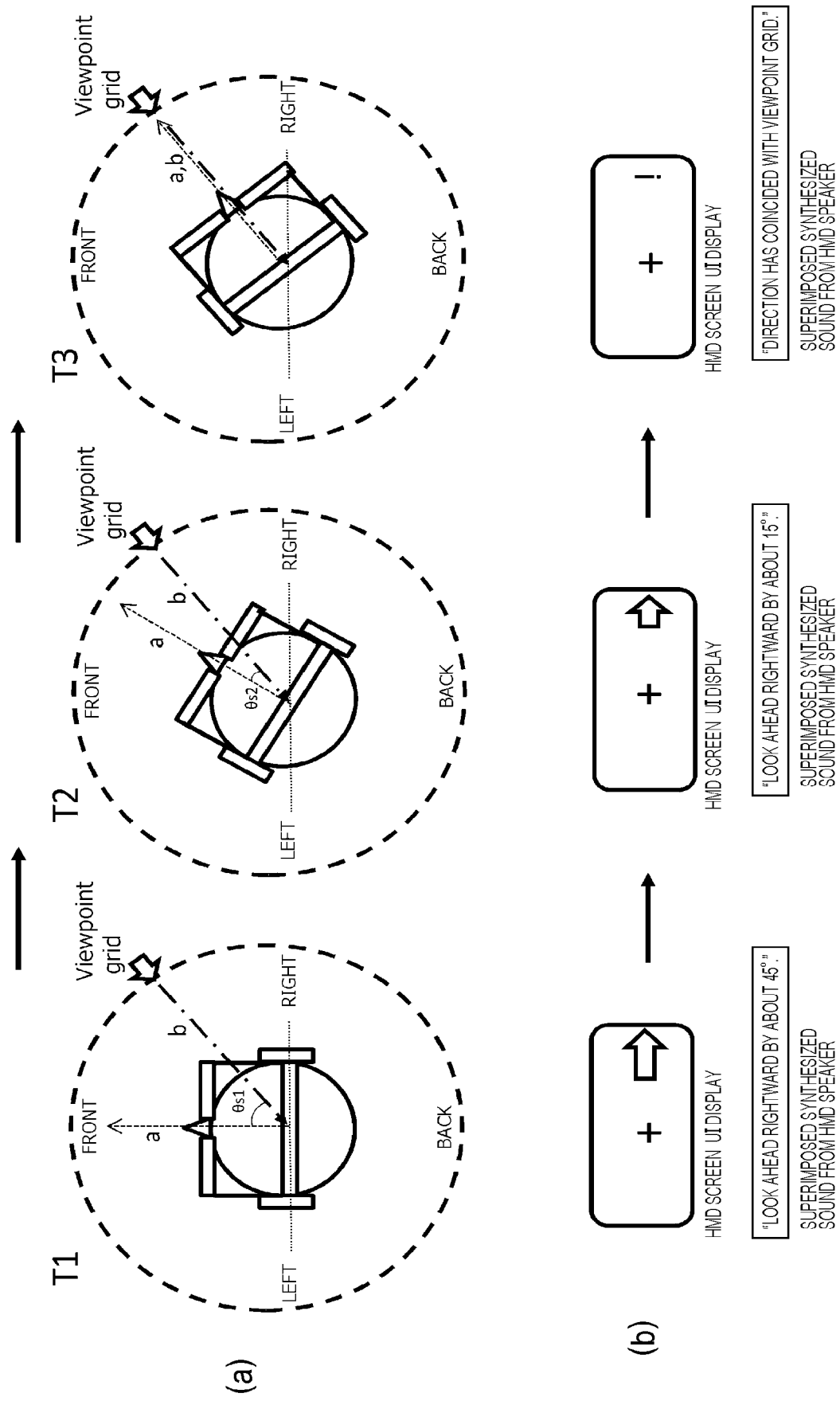
FIG. 23 is a diagram illustrating an example in the case of viewing and hearing using an HMD and an HMD speaker.

FIG. 23 illustrates an example in the case of viewing and hearing using a head mounted display (HMD) and an HMD speaker (headphones). In this case, as illustrated in FIG. 23(a), by a user wearing the HMD turning his/her neck from the left to the right in the order of T1, T2, and T3, an observing point comes closer to a viewpoint grid, and in the state illustrated in T3, the observing point is in a state in which the observing point corresponds to the viewpoint grid. FIG. 23(b) illustrates an example of UI display an HMD screen that is obtained when the user wearing the HMD turns his/her neck from the left to the right in the order of T1, T2, and T3.

In this case, until an observing point corresponds to the viewpoint grid, the direction of the viewpoint grid is indicated by the direction of an arrow, and the length of the arrow indicates the degree of reach until a viewer view corresponds to the viewpoint grid. Then, when the observing point corresponds to the viewpoint grid, a predetermined mark such as an exclamation mark "!" in the example illustrated in the drawing is displayed. Therefore, the user can smoothly move the observing point to the viewpoint grid.

Note that, as described above, simultaneously with guiding the movement of an observing point of the user by UI display, or without performing UI display, by the HMD speaker, guidance may be given by superimposed synthesized sound from the HMD speaker like "look ahead rightward by about 45°.", "look ahead rightward by about 15°.", or "the direction has coincided with the viewpoint grid." In this manner, by user notification of a relationship between the position of a current viewpoint and the position indicated by information regarding a viewpoint grid (grid position synchronization notification) being controlled by a control unit, the user can easily move the position of the current viewpoint to the position indicated by information regarding a viewpoint grid. The same applies to the other examples.

Note that, during a period in which the user is performing a hear turning operation for causing an observing point to correspond to a viewpoint grid, the video renderer 205 stops rendering processing for obtaining display image data, or continues the rendering processing for obtaining display image data even in this period. Note that, on the HMD screen in FIG. 23(b), the mark "+" indicates the center position of the display image, that is, indicates a viewpoint corresponding to an observing point position.

Furthermore, by the rendering processing corresponding to the observing point position of the audio renderer 208, which will be described later, the reproduction of sound from an HMD speaker is adjusted in such a manner as to correspond to the observing point position of the user. In the example illustrated in the drawing, a broken line a indicates a line-of-sight direction of the user (front direction of the use), and a dashed-dotted line b illustrates a direction from which the user hears sound of the viewpoint grid. For example, T1 indicates a state in which the user hears sound of the viewpoint grid from a direction rotated rightward by θs1 from the front direction. In contrast to this, T2 indicates a state in which the user hears sound of the viewpoint grid from a direction rotated rightward by θs2 (<θs1) from the front direction. Moreover, T3 indicates a state in which the user hears sound of the viewpoint grid from the front direction of itself.

Figure 24:
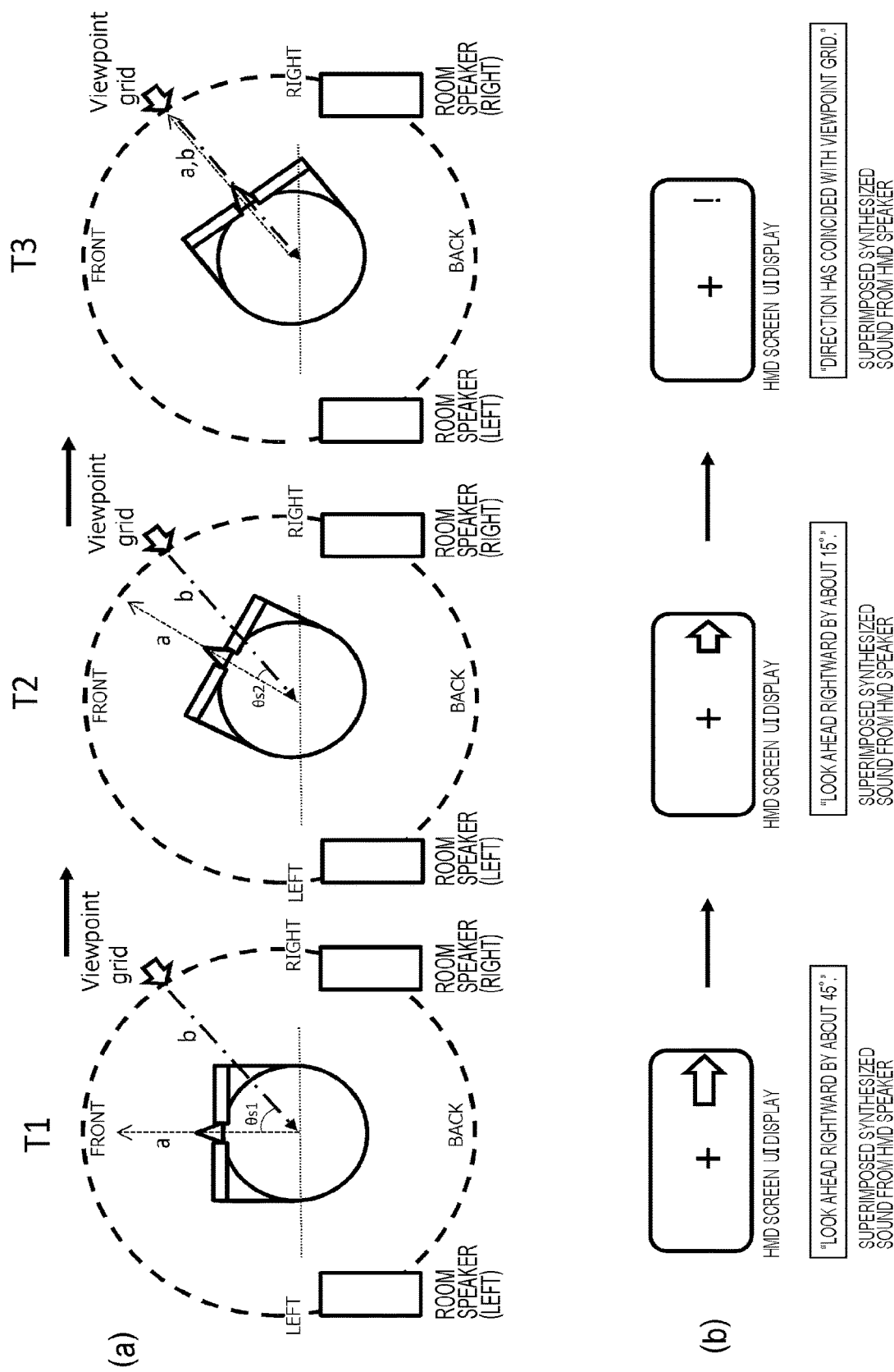
FIG. 24 is a diagram illustrating an example in the case of viewing and hearing using an HMD and a room speaker.

FIG. 24 illustrates an example in the case of viewing and hearing using a head mounted display (HMD) and a room speaker. Note that, although the example illustrated in the drawing illustrates a case where the number of speakers is two, three or more speakers may be provided. This example is similar to the example in FIG. 23 except that room speakers are used in place of an HMD speaker.

Also in this case, similarly to the example of using an HMD speaker in FIG. 23, by the rendering processing corresponding to the observing point position of the audio renderer 208, which will be described later, the reproduction of sound from room speakers is adjusted in such a manner as to correspond to the observing point position of the user. In the example illustrated in the drawing, a broken line a indicates a line-of-sight direction of the user (front direction of the use), and a dashed-dotted line b illustrates a direction from which the user hears sound of the viewpoint grid. For example, T1 indicates a state in which the user hears sound of the viewpoint grid from a direction rotated rightward by θs1 from the front direction. In contrast to this, T2 indicates a state in which the user hears sound of the viewpoint grid from a direction rotated rightward by θs2 (<θs1) from the front direction. Moreover, T3 indicates a state in which the user hears sound of the viewpoint grid from the front direction of itself.

Figure 25:
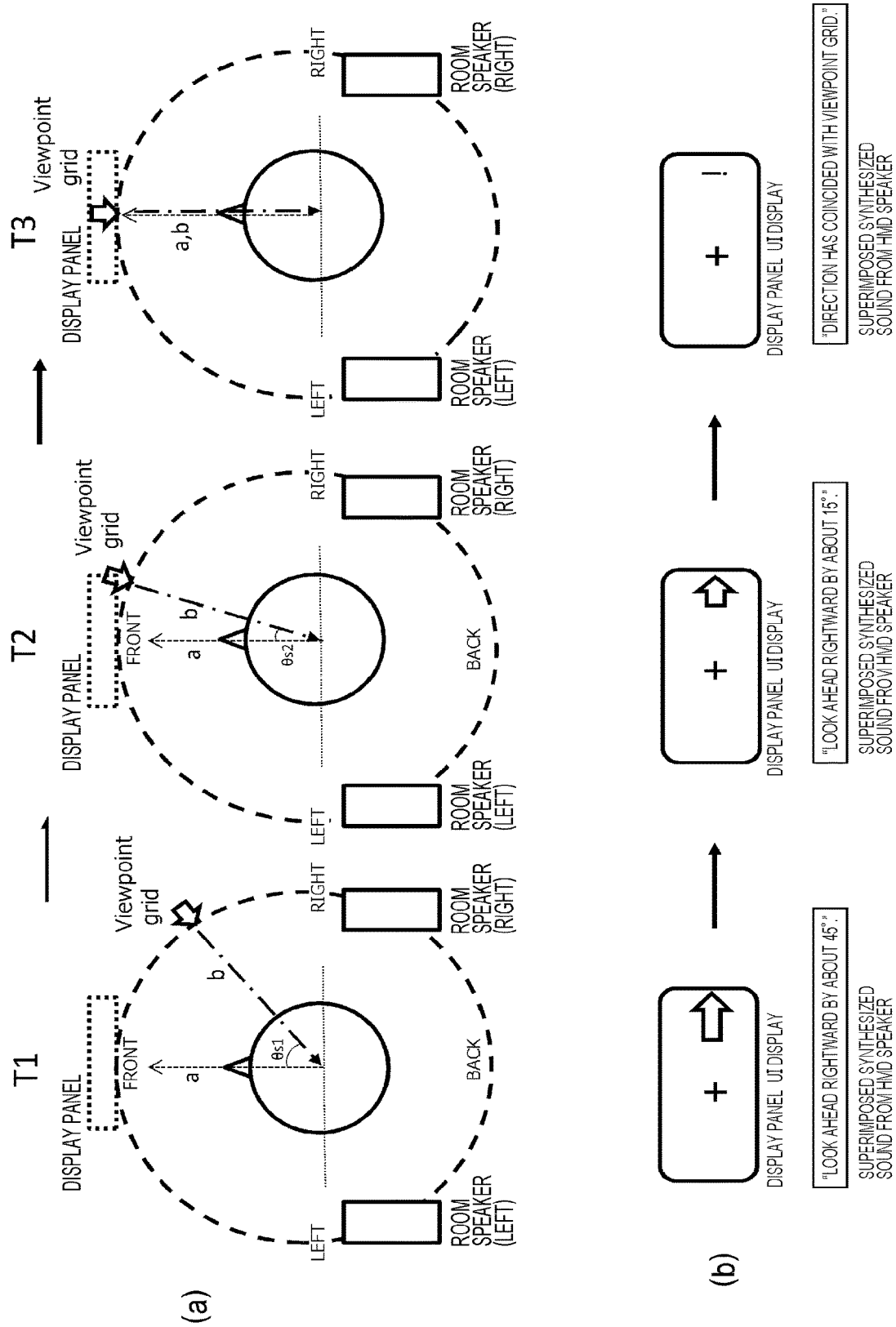
FIG. 25 is a diagram illustrating an example in the case of viewing and hearing using a display panel such as a TV and a room speaker.

FIG. 25 illustrates an example in the case of viewing and hearing using a display panel such as a TV and a room speaker. Note that, although the example illustrated in the drawing illustrates a case where the number of speakers is two, three or more speakers may be provided. In this case, as illustrated in FIG. 25(a), by performing a scroll operation, the user moves the position of the viewpoint grid in the order of T1, T2, and T3, and in the state illustrated in T3, the observing point is in a state in which the observing point corresponds to the viewpoint grid. FIG. 25(b) illustrates an example of UI display on a display panel that is obtained when the user performs a scroll operation. Note that the scroll operation can be performed by a pointing device or voice UI input.

In this case, until the viewpoint grid corresponds to an observing point, the direction of the viewpoint grid is indicated by the direction of an arrow, and the length of the arrow indicates the degree of reach until a viewer view corresponds to the viewpoint grid. Then, when the viewpoint grid corresponds to the observing point, a predetermined mark such as an exclamation mark "!" in the example illustrated in the drawing is displayed. Therefore, the user can smoothly move the viewpoint grid to the observing point.

Note that, as described above, simultaneously with guiding the movement of a viewpoint grid of the user by UI display, or without performing UI display, by the room speakers, guidance may be given by superimposed synthesized sound from the room speakers like "look ahead rightward by about 45°.", "look ahead rightward by about 15°.", or "the direction has coincided with the viewpoint grid."

Note that, during a period in which the user is performing a scroll operation for causing a viewpoint grid to correspond to an observing point, the video renderer 205 stops rendering processing for obtaining display image data, or continues the rendering processing for obtaining display image data even in this period Note that, on the display panel surface in FIG. 25(b), the mark "+" indicates the center position of the display image, that is, indicates a viewpoint corresponding to an observing point position.

Furthermore, by the rendering processing corresponding to the observing point position of the audio renderer 208, which will be described later, the reproduction of sound from room speakers is adjusted in such a manner as to correspond to the observing point position of the user. In the example illustrated in the drawing, a broken line a indicates a line-of-sight direction of the user (front direction of the use), and a dashed-dotted line b illustrates a direction from which the user hears sound of the viewpoint grid. For example, T1 indicates a state in which the user hears sound of the viewpoint grid from a direction rotated rightward by θs1 from the front direction. In contrast to this, T2 indicates a state in which the user hears sound of the viewpoint grid from a direction rotated rightward by θs2 (<θs1) from the front direction. Moreover, T3 indicates a state in which the user hears sound of the viewpoint grid from the front direction of itself.

Referring back to FIG. 4, the container decoder 203 extracts an audio stream from the audio MP4 stream that has been transmitted from the service transmission system 100, and transmits the audio stream to the audio decoder 207. The audio decoder 207 obtains HoA components serving as data of scene-based audio and information regarding a predetermined number of viewpoint grids by performing decoding processing on the audio stream.

The audio renderer 208 performs rendering processing on the HoA components on the basis of information regarding a viewpoint grid (φ,θ), and reproduces voice corresponding to the viewpoint grid. In this case, for example, when the user selects a predetermined viewpoint grid from the group determined on the basis of an attribute of the user or contractual coverage in a video system as described above, rendering processing is performed on the basis of a viewpoint grid of an audio system that corresponds to the viewpoint grid, and sound reproduction in a case where the viewpoint grid is set as an observing point position is performed. Therefore, interlock between an image and a voice is implemented.

Note that, although the viewpoint grid of the audio system is basically set similarly to the viewpoint grid of the video system, the viewpoint grid of the audio system is considered to be set to be shifted. Thus, in a case where the viewpoint grid of the audio system exists, rendering processing is performed on the basis of the viewpoint grid of the audio system that corresponds to the viewpoint grid of the selected video system. It should be appreciated that, in a case where the viewpoint grid of the audio system does not exist, rendering processing is considered to be performed on the basis of the viewpoint grid of the video system.

Note that, as described above, in addition to rendering processing for performing reproduction of voice corresponding to the viewpoint grid, even in a case where an observing point position does not correspond to a viewpoint position, the audio renderer 208 can perform reproduction of voice corresponding to the observing point position, on the basis of information regarding the observing point position (φ,θ).

Figure 26:
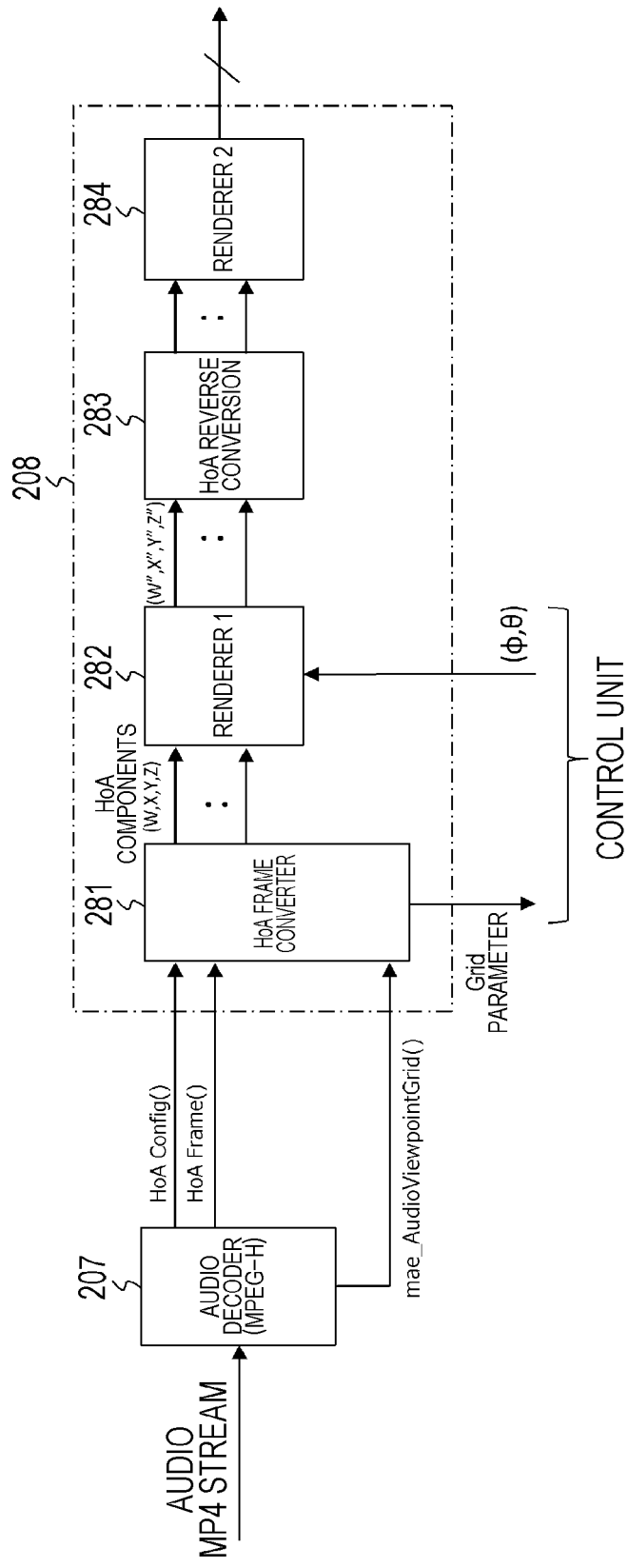
FIG. 26 is a diagram illustrating a specific configuration example of an audio decoder and an audio renderer.

FIG. 26 illustrates a specific configuration example of the audio decoder 207 and the audio renderer 208. The audio decoder 207 extracts "HoAConfig( )", "HoAFrame( )", and "mae_audio_viewpoint_grid( )" included in an MPEG-H audio stream packet (refer to FIG. 18), by decoding an audio MP4 stream.

The audio renderer 208 includes an HoA frame converter 281, a renderer (renderer 1) 282, an HoA reverse conversion unit 283, and a renderer (renderer 2)284. In the HoA frame converter 281, on the basis of "HoAConfig( )", "HoAFrame( )", and "mae_audio_viewpoint_grid( )", HoA components "W, X, Y, and Z" corresponding to one frame, and a predetermined number of grid parameters (information regarding a viewpoint grid) are acquired for each audio frame. The predetermined number of grid parameters is transmitted to a control unit.

The HoA components "W, X, Y, and Z" obtained by the HoA frame converter 281 are supplied to the renderer 282. Furthermore, an azimuth angle Φ and an elevation angle φ that serve as information regarding an observing point position (when an observing point corresponds to a viewpoint grid, the same as a viewpoint grid position) are supplied to this renderer 282 from the control unit. Note that the control unit acquires a shift of the observing point from the viewpoint grid, on the basis of an output from a head tracking sensor that detects head turning of the user, or scroll operation information of the user, and adjusts values of (φ,θ).

In the renderer 282, HoA components "W, X, Y, and Z" are converted into HoA components "W", X", Y", and Z"" for reproducing sound corresponding to the observing point position, on the basis of information regarding the observing point position (φ,θ). This conversion will be further described with reference to FIG. 27.

Figure 27:
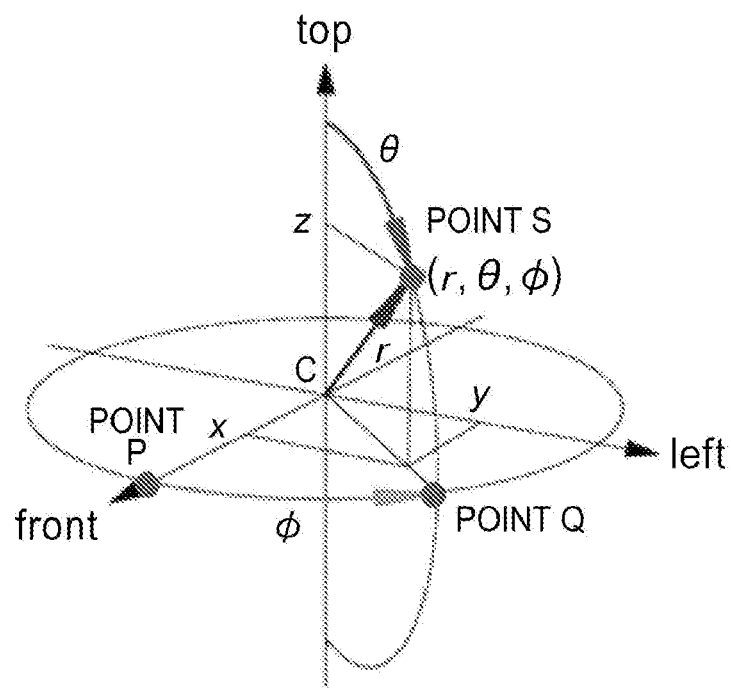
FIG. 27 is a diagram for describing processing of converting HoA components "W, X, Y, and Z" into HoA components "W'', X'', Y'', and Z'''" corresponding to an observing point position.

When HoA components "W, X, Y, and Z" are applied to a certain observing point, in a case where an observing point is changed from a point P (r,0,0) on an x axis that is shifted from the position of an origin C, which is an intersection point of three axes in FIG. 27, to an arbitrary point S (r,θ",φ), the HoA components "W'", X", Y", and Z"" are obtained in the following order. Here, θ'=π/2−θ is obtained.

First of all, the acoustic field reproduction of a point Q changed from the point P by φ on the horizontal surface can be implemented by converting the HoA components "W, X, Y, and Z" into the HoA components "W', X', Y', and Z'" by the following formula (2).

[Math. 2]

$$\begin{bmatrix} W' \\ X' \\ Y' \\ Z' \end{bmatrix} = \begin{bmatrix} 1 & 0 & 0 & 0 \\ 0 & \cos\varphi & -\sin\varphi & 0 \\ 0 & \sin\varphi & \cos\varphi & 0 \\ 0 & 0 & 0 & 1 \end{bmatrix} \begin{bmatrix} W \\ X \\ Y \\ Z \end{bmatrix} \quad (2)$$

Next, the acoustic field reproduction of a point S changed from the point Q by θ' on the vertical surface can be implemented by converting the HoA components "W', X', Y', and Z'" into the HoA components "W", X", Y", and Z"" by the following formula (3).

[Math. 3]

$$\begin{bmatrix} W'' \\ X'' \\ Y'' \\ Z'' \end{bmatrix} = \begin{bmatrix} 1 & 0 & 0 & 0 \\ 0 & \cos\theta' & 0 & -\sin\theta' \\ 0 & 0 & 1 & 0 \\ 0 & \sin\theta' & 0 & \cos\theta' \end{bmatrix} \begin{bmatrix} W' \\ X' \\ Y' \\ Z' \end{bmatrix} \quad (3)$$

Eventually, the acoustic field reproduction of the point S can be implemented by converting the HoA components "W, X, Y, and Z" into the HoA components "W", X", Y", and Z"" by the following formula (4).

[Math. 4]

$$\begin{bmatrix} W'' \\ X'' \\ Y'' \\ Z'' \end{bmatrix} = \begin{bmatrix} 1 & 0 & 0 & 0 \\ 0 & \cos\theta' & 0 & -\sin\theta' \\ 0 & 0 & 1 & 0 \\ 0 & \sin\theta' & 0 & \cos\theta' \end{bmatrix} \begin{bmatrix} 1 & 0 & 0 & 0 \\ 0 & \cos\varphi & -\sin\varphi & 0 \\ 0 & \sin\varphi & \cos\varphi & 0 \\ 0 & 0 & 0 & 1 \end{bmatrix} \begin{bmatrix} W \\ X \\ Y \\ Z \end{bmatrix} \quad (4)$$

$$= \begin{bmatrix} 1 & 0 & 0 & 0 \\ 0 & \cos\theta'*\cos\varphi & -\cos\theta'*\sin\varphi & -\sin\theta' \\ 0 & \sin\varphi & \cos\varphi & 0 \\ 0 & \sin\theta'*\cos\varphi & -\sin\theta'*\sin\varphi & \cos\theta' \end{bmatrix} \begin{bmatrix} W \\ X \\ Y \\ Z \end{bmatrix}$$

Referring back to FIG. 26, in the HoA reverse conversion unit 283, HoA components "W", X", Y", and Z"" for reproducing sound corresponding to the observing point position obtained by the renderer 282 are converted into drive signals of a predetermined number of loudspeakers arranged to surround a listener. For example, the HoA components "W", X", Y", and Z"" are converted into drive signals "$L_F$, $R_F$, $L_B$, and $R_B$" of four loudspeakers by the following formulae (5) to (8).

$$L_F = W'' + 0.707(X'' + Y'') \quad (5)$$

$$R_F = W'' + 0.707(X'' - Y'') \quad (6)$$

$$L_B = W'' + 0.707(-X'' + Y'') \quad (7)$$

$$R_B = W'' + 0.707(-X'' - Y'') \quad (8)$$

Figure 28:
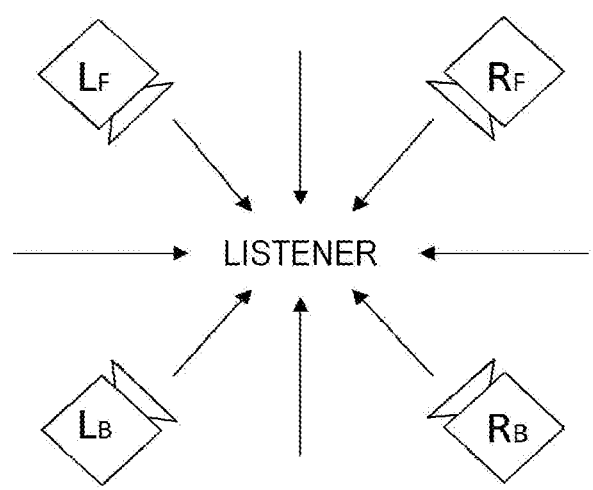
FIG. 28 is a diagram for describing HoA components "W'', X'', Y'', and Z'''" being converted into drive signals of a predetermined number of loudspeakers arranged to surround a listener.

Here, the four loudspeakers are arranged on the horizontal surface at equal intervals so as to surround a listener as illustrated in FIG. 28. In the drawing, $L_F$ denotes a loudspeaker arranged on the left front side of the listener, RF denotes a loudspeaker arranged on the right front side of the listener, $L_B$ denotes a loudspeaker arranged on the left rear side of the listener, and $R_B$ denotes a loudspeaker arranged on the right rear side of the listener.

In the renderer 284, a voice signal of a predetermined channel is generated on the basis of drive signals of a predetermined number of loudspeakers that have been converted by the HoA reverse conversion unit 283. For example, in the case of using an HMD speaker, by convoluting a head related transfer function (HRTF) corresponding to the position of each loudspeaker and adding up, a binaural signal is generated.

Note that the above description has been given of a case where the reproduction of voice corresponding to an observing point position is performed by including a shift of an observing point from a viewpoint grid, into information regarding an observing point position (φ,θ) that is supplied from the control unit to the renderer 282, but a shift of an observing point from a viewpoint grid can be considered to be adjusted when a voice signal of a predetermined channel is generated in the renderer 284 on the basis of drive signals of a predetermined number of loudspeakers.

Configuration Example of Service Transmission System

Figure 29:
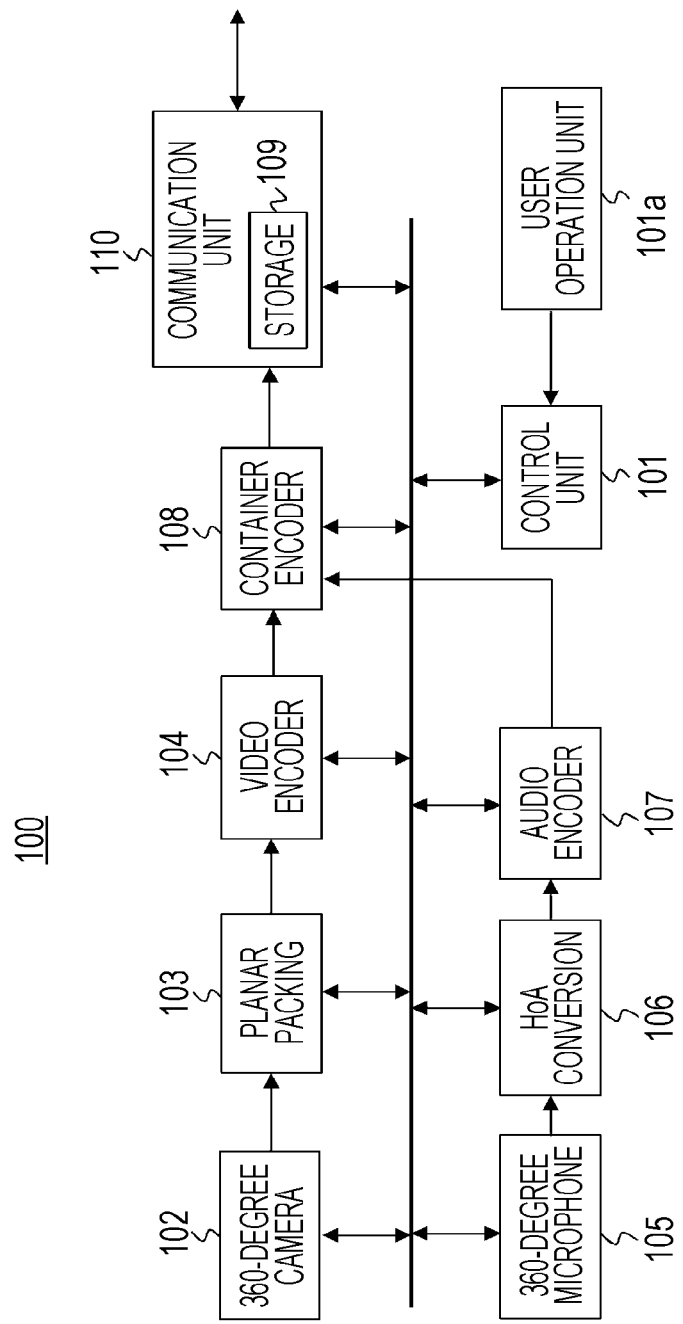
FIG. 29 is a block diagram illustrating a configuration example of a service transmission system.

FIG. 29 illustrates a configuration example of the service transmission system 100. This service transmission system 100 includes a control unit 101, a user operation unit 101a, the 360-degree camera 102, the planar packing unit 103, the video encoder 104, the 360-degree microphone 105, the HoA conversion unit 106, the audio encoder 107, the container encoder 108, and a communication unit 110 including the storage 109.

The control unit 101 includes a central processing unit (CPU), and controls an operation of each unit of the service transmission system 100 on the basis of a control program. The user operation unit 101a is a keyboard, a mouse, a touch panel, a remote controller, or the like for the user performing various operations.

The 360-degree camera 102 captures an image of a subject using a predetermined number of cameras, and obtains image data of a spherical surface captured image (360° VR image). For example, the 360-degree camera 102 performs image capturing using a Back to Back method, and obtains, as a spherical surface captured image, a super-wide viewing angle front surface image and a super-wide viewing angle back surface image having viewing angles of 180° or more that have been both captured using a fisheye lens (refer to FIG. 5(a)).

The planar packing unit 103 obtains a rectangular projection picture by cutting out a part or all of a spherical surface captured image obtained by the 360-degree camera 102, and performing planar packing (refer to FIG. 5(b)). In this case, as a format type of the projection picture, for example, Equirectangular, Cross-cubic, or the like is selected. Note that, in the planar packing unit, scaling is performed on a projection picture as necessary, and a projection picture with predetermined resolution is obtained (refer to FIG. 5(c)).

The video encoder 104 performs encoding such as MPEG4-AVC or HEVC, for example, on image data of a projection picture from the planar packing unit 103, obtains encoded image data, and generates a video stream including the encoded image data. Cutout position information is inserted into an SPS NAL unit of a video stream (refer to information regarding "conformance_window" in FIG. 6).

Furthermore, the video encoder 104 inserts an SEI message having rendering metadata (rendering metainformation), into a portion of "SEIs" of an access unit (AU). Information regarding a cutout range in a case where planar packing of a spherical surface captured image is performed, information regarding a scaling ratio from the original size of a projection picture, information regarding a format type of a projection picture, information indicating whether or not a backward compatible setting for causing the center O (p,q) of the cutout position to coincide with the reference point RP (x,y) of the projection picture is made, and the like are inserted into the rendering metainformation (refer to FIG. 8).

Furthermore, this rendering metainformation includes information regarding a predetermined number of grouped viewpoint grids (refer to FIG. 11). The information regarding the viewpoint grid includes information regarding an azimuth angle (azimuth information) and an elevation angle (elevation angle information).

The 360-degree microphone 105 is an Ambisonic microphone that collects sound from 360° all directions, and outputs voice signals Lb, Lf, Rb, and Rf obtained by collecting sound by four microphone capsules. The HOA conversion unit 106 obtains HoA components "W, X, Y, and Z" serving as data of scene-based audio, by resolving the four voice signals Lb, Lf, Rb, and Rf obtained by the 360-degree microphone 105, into orthogonal components having different cycles on the spherical surface (refer to Formula (1)).

The audio encoder 107 generates an MPEG-H audio stream including the HoA components "SW, X, Y, and Z" obtained by the HOA conversion unit 106, and information regarding a predetermined number of viewpoint grids. In this case, the HoA components "SW, X, Y, and Z" and the information regarding a predetermined number of viewpoint grids are included in an audio stream packet (refer to FIG. 18).

The container encoder 108 generates an MP4 stream including a video stream obtained by the video encoder 104, and an audio stream obtained by the audio encoder 107, as a delivery stream. In this case, regarding a video, rendering metadata (refer to FIG. 8) is inserted also into a layer of the container (refer to FIG. 21).

The storage 109 included in the communication unit 110 accumulates MP4 streams generated in the container encoder 108. The communication unit 110 receives a delivery demand request from the service receiving apparatus 200, and transmits an MPD file (refer to FIG. 22) to the service receiving apparatus 200 in response to the delivery demand request. The service receiving apparatus 200 recognizes the configuration of a delivery stream on the basis of this MPD file. Furthermore, the communication unit 110 receives a delivery demand for an MP4 stream from the service receiving apparatus 200, and transmits the MP4 stream to the service receiving apparatus 200.

Configuration Example of Service Receiving Apparatus

Figure 30:
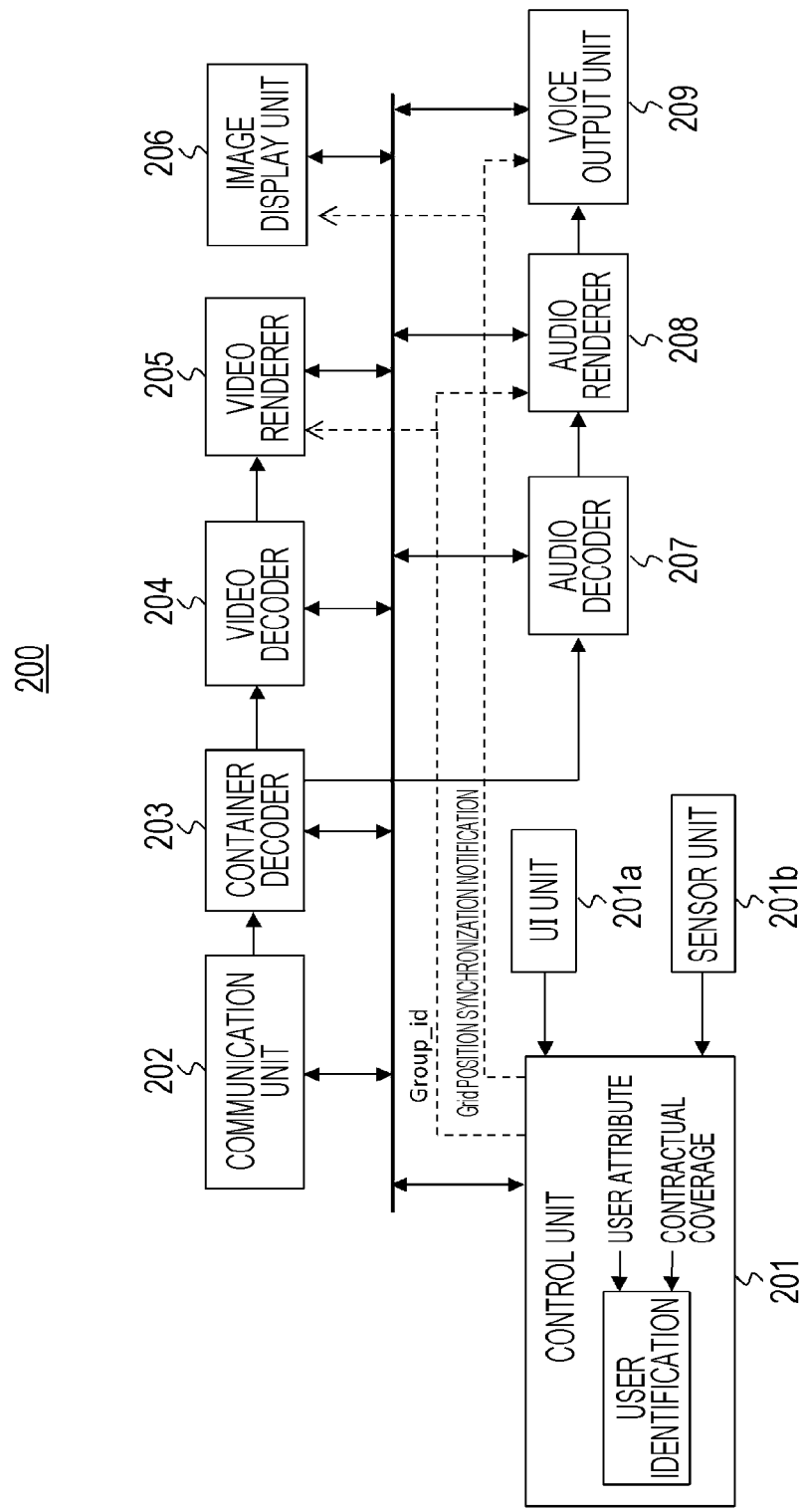
FIG. 30 is a block diagram illustrating a configuration example of a service receiving apparatus.

FIG. 30 illustrates a configuration example of the service receiving apparatus 200. This service receiving apparatus 200 includes a control unit 201, a UI unit 201a, a sensor unit 201b, a communication unit 202, the container decoder 203, the video decoder 204, the video renderer 205, an image display unit 206, the audio decoder 207, the audio renderer 208, and a voice output unit 209.

The control unit 201 includes a central processing unit (CPU), and controls an operation of each unit of the service receiving apparatus 200 on the basis of a control program. The UI unit 201a is for performing user interface, and includes, for example, a pointing device for the user operating the movement of a display region, a microphone for the user inputting voice for issuing a voice instruction for moving a display region, and the like. The sensor unit 201b includes various sensors for acquiring a user state and information regarding an environment, and include, for example, a posture detection sensor mounted on a Head Mounted Display (HMD), and the like.

The communication unit 202 receives a delivery demand request to the service transmission system 100 under the control of the control unit 201, and receives an MPD file (refer to FIG. 22) from the service transmission system 100 in response to the delivery demand request. The communication unit 202 transmits this MPD file to the control unit 201. The control unit 201 recognizes a configuration of a delivery stream on the basis of this MPD file.

Furthermore, the communication unit 202 transmits a delivery demand (transmission demand) for an MP4 stream to the service transmission system 100 under the control of the control unit 201, and receives MP4 streams of a video and audio from the service transmission system 100 in response to the demand.

Here, on the basis of information regarding a movement direction and a movement amount that is obtained by a gyro sensor or the like mounted on the HMD, or on the basis of, pointing information that is based on a user operation or voice UI information of the user, the control unit 101 obtains a direction and a speed of the movement of a display region, and further obtains information regarding switching of a viewpoint grid.

Furthermore, the control unit 201 includes a function of user identification. On the basis of an attribute (age, gender, interest, proficiency level, login information, and the like) of a user or contractual coverage, the control unit 201 identifies the type of the user, and determines a group of a viewpoint grid that can be used by the user. Then, the control unit 201 brings the video renderer 205 and the audio renderer 208 into a state of using a viewpoint grid of the group that can be used by the user.

The container decoder 203 extracts rendering metadata (refer to FIG. 8) inserted in an Initialization Segment (IS) of a video MP4 stream, and transmits the rendering metadata to the control unit 201. Therefore, the control unit 201 acquires information regarding a predetermined number of grouped viewpoint grids (video system).

The video decoder 204 obtains a projection picture (image data) by performing decoding processing on the video stream. Furthermore, the video decoder 204 extracts a parameter set and an SEI message inserted to a video stream, and transmits the parameter set and the SEI message to the control unit 201. This extracted information includes information regarding a cutout position "conformance_window" inserted in an SPS NAL packet, and further includes an SEI message having rendering metadata (refer to FIG. 8).

Under the control of the control unit 201, the video renderer 205 obtains a rendering image (image data) by performing rendering processing on the projection picture (image data). In this case, when a user selects a predetermined viewpoint grid from the group determined on the basis of the attribute of the user or contractual coverage, the video renderer 205 obtains display image data having the center position corresponding to the viewpoint grid.

On the basis of the UI image (refer to FIG. 16) superimposed on the main image, the user can recognize a current display range in the range m1 of the entire image, and furthermore, can recognize a viewpoint grid further selectable by itself. On the basis of this recognition, the user can select an arbitrary viewpoint grid and switch a display image (refer to FIGS. 23, 24, and 25). The image display unit 206 displays rendering image obtained by the video renderer 205.

Furthermore, the container decoder 203 extracts an audio stream from a video MP4 stream received by the communication unit 202, and transmits the audio stream to the audio decoder 207. The audio decoder 207 obtains HoA components serving as data of scene-based audio and information regarding a predetermined number of grouped viewpoint grids (audio system) by performing decoding processing on the audio stream. The audio decoder 207 transmits this information regarding the viewpoint grid to the control unit 201.

Under the control of the control unit 201, the audio renderer 208 performs rendering processing on the HoA components on the basis of information regarding a viewpoint grid (φ,θ), and obtains rendering voice (voice data). In this case, as described above, the audio renderer 208 performs rendering processing on the basis of a viewpoint grid of a voice system that corresponds to a viewpoint grid selectively used in the video system, and reproduces voice corresponding to a time when an observing point position corresponds to the viewpoint grid. The voice output unit 209 outputs the rendering voice obtained by the audio renderer 208. This voice output unit 209 is an HMD speaker or room speaker, for example (refer to FIGS. 23, 24, and 25). Note that, in a case where the viewpoint grid of the audio system does not exist, rendering processing may be performed on the basis of the viewpoint grid of the video system.

As described above, in the transmission and reception system 10 illustrated in FIG. 3, the service transmission system 100 transmits HoA components serving as data of scene-based audio and information regarding a predetermined number of viewpoint grids. Therefore, on the reception side, a voice output corresponding to a fixed position of a wide viewing angle image can be easily obtained.

Furthermore, in the transmission and reception system 10 illustrated in FIG. 3, the service transmission system 100 transmits information regarding a grouped viewpoint grid. Therefore, on the reception side, a voice output corresponding to a fixed position of a wide viewing angle image can be obtained for each intended purpose or each user.

Furthermore, in the transmission and reception system 10 illustrated in FIG. 3, the service receiving apparatus 200 acquires HoA components serving as data of scene-based audio and information regarding a predetermined number of viewpoint grids, and obtains output voice data by processing the HoA components on the basis of the information regarding the viewpoint grids. Therefore, a voice output corresponding to a fixed position of a wide viewing angle image can be easily obtained.

Furthermore, in the transmission and reception system 10 illustrated in FIG. 3, the service receiving apparatus 200 uses viewpoint information of a group determined on the basis of an attribute of the user or contractual coverage. Therefore, restriction can be performed in such a manner that a voice output corresponding to an attribute of the user or contractual coverage is obtained.

Furthermore, in the transmission and reception system 10 illustrated in FIG. 3, the service receiving apparatus 200 guides the movement of an observing point of the user by UI display or voice. Therefore, a voice output corresponding to a fixed position of a wide viewing angle image can be easily obtained.

2. Modified Example

Note that, in the above-described embodiment, an example in which a container is an MP4 (ISOBMFF) has been described. However, the present technology is not limited to an example in which a container is an MP4, and can be similarly applied even if a container is a container of another format such as MPEG-2 TS or MMT.

Furthermore, in the above-described embodiment, an example in which a zero order and a first order are used as HoA components serving as data of scene-based audio has been described, but a configuration in which a higher-order component is used can be similarly considered.

Furthermore, in the above-described embodiment, an example in which HoA components serving as data of scene-based audio and information regarding a predetermined number of registered viewpoint grids are received from the service transmission system 100, but a configuration of acquiring HoA components serving as data of scene-based audio and information regarding a predetermined number of registered viewpoint grids, by reproducing from recording media can be similarly considered.

Furthermore, in the above-described embodiment, an example in which both a video system and an audio system exist has been described, but a configuration only including a voice system can be considered.

Furthermore, in the above-described embodiment, an example of the transmission and reception system 10 including the service transmission system 100 and the service receiving apparatus 200 has been described, but the configuration of a transmission and reception system to which the present technology can be applied is not limited to this. For example, a case where a portion of the service receiving apparatus 200 is changed to a set-top box and a display that are connected by a digital interface such as a high-definition multimedia interface (HDMI), for example, can also be considered. Note that "HDMI" is registered trademark.

Furthermore, the present technology can also employ the following configurations.

(1) A transmission apparatus including:

a transmission unit configured to transmit spatial voice data and information regarding a predetermined number of registered viewpoints.

(2) The transmission apparatus according to (1) described above, in which the information regarding the viewpoints includes information regarding azimuth angles and elevation angles that indicate positions of the viewpoints.

(3) The transmission apparatus according to (1) or (2) described above, in which the predetermined number of registered viewpoint information is grouped.

(4) The transmission apparatus according to any of (1) to (3) described above, in which the spatial voice data is data of scene-based audio.

(5) The transmission apparatus according to (4) described above, in which the data of the scene-based audio is each component of an HoA format.

(6) The transmission apparatus according to (4) or (5) described above, in which the transmission unit transmits the data of the scene-based audio and the information regarding the predetermined number of registered viewpoints with being included in a packet of object audio.

(7) The transmission apparatus according to (6) described above, in which the packet of the object audio is an MPEG-H audio stream packet.

(8) The transmission apparatus according to (6) or (7) described above, in which the transmission unit transmits the packet of the object audio with being included in a container of ISOBMFF.

(9) A transmission method including:
a step of transmitting, by a transmission unit, spatial voice data and information regarding a predetermined number of registered viewpoints.

(10) A processing apparatus including:
an acquisition unit configured to acquire spatial voice data and information regarding a predetermined number of registered viewpoints; and
a processing unit configured to obtain output voice data by processing the spatial voice data on the basis of the information regarding the registered viewpoints.

(11) The processing apparatus according to (10) described above,
in which the information regarding the viewpoints includes information regarding azimuth angles and elevation angles that indicate positions of the viewpoints.

(12) The processing apparatus according to (10) or (11) described above,
in which the spatial voice data is data of scene-based audio.

(13) The processing apparatus according to (12) described above,
in which the data of the scene-based audio is each component of an HoA format.

(14) The processing apparatus according to (12) or (13) described above,
in which the acquisition unit receives the data of the scene-based audio and the information regarding the predetermined number of registered viewpoints, or acquires the data of the scene-based audio and the information regarding the predetermined number of registered viewpoints by reproducing from a media.

(15) The processing apparatus according to any of (12) to (14) described above,
in which the acquisition unit acquires the data of the scene-based audio and the information regarding the predetermined number of registered viewpoints from a packet of received object audio.

(16) The processing apparatus according to (15) described above,
in which the packet of the object audio is an MPEG-H audio stream packet.

(17) The processing apparatus according to any of (10) to (16) described above,
in which the acquisition unit acquires the information regarding the predetermined number of registered viewpoints from a video processing system configured to obtain display image data by processing image data of a wide viewing angle image on the basis of viewpoint information.

(18) The processing apparatus according to any of (10) to (17) described above,
in which the information regarding the predetermined number of registered viewpoints is grouped, and
the processing unit uses registered viewpoint information of a group determined on the basis of an attribute of a user or contractual coverage.

(19) The processing apparatus according to any of (10) to (18) described above, further including
a control unit configured to control user notification of a relationship between a position of a current viewpoint and a position indicated by the information regarding the registered viewpoints.

(20) A processing method including:
a step of acquiring, by an acquisition unit, spatial voice data and information regarding a predetermined number of registered viewpoints; and a step of obtaining, by a processing unit, output voice data by processing the spatial voice data on the basis of the information regarding the registered viewpoints.

Main characteristics of the present technology lie in that, by transmitting spatial voice data and information regarding a predetermined number of registered viewpoints, on the reception side, a voice output corresponding to a fixed position of a wide viewing angle image can be easily obtained (refer to FIGS. 18, 19, and 28).

REFERENCE SIGNS LIST

10 Transmission and reception system
100 Service transmission system
101 Control unit
101a User operation unit
102 360-degree camera
103 Planar packing unit
104 Video encoder
105 360-degree microphone
106 HoA conversion unit
107 Audio encoder
108 Container encoder
109 Storage
110 Communication unit
200 Service receiving apparatus
201 Control unit
201a UI unit
201b Sensor unit
202 Communication unit
203 Container decoder
204 Video decoder
205 Video renderer
206 image display unit
207 Audio decoder
208 Audio renderer
209 Voice output unit
281 HoA frame converter
282,284 Renderer
283 HoA reverse conversion unit

The invention claimed is:
1. A transmission apparatus, comprising:
processing circuitry configured to:
generate a container that includes a video stream and an audio stream.
the video stream including encoded image data of a projection picture, and
the audio stream including encoded spatial voice data:
insert rendering metadata in the container, the rendering metadata including a video viewpoint syntax specifying one or more video viewpoints, one or more viewpoint identifiers respectively associated with the one or more video viewpoints, and corresponding coordinate information of the one or more video viewpoints; and
insert an audio viewpoint syntax in the audio stream, the audio viewpoint syntax specifying one or more audio viewpoints, one or more parameters defining a number of the one or more audio viewpoints included in the audio viewpoint syntax, the one or more viewpoint identifiers respectively associated with the one or more audio viewpoints, and corresponding coordinate information of the one or more audio viewpoints; and transmission circuitry configured to transmit the container that includes the encoded image data, the encoded spatial voice data, the video viewpoint syntax, and the audio viewpoint syntax to a reception apparatus, wherein the video viewpoint syntax causes the reception apparatus to generate a main image from the encoded image data, the main image having a center position corresponding to a selected one of the one or more video viewpoints, the audio viewpoint syntax causes the reception apparatus to generate a voice signal from the encoded spatial voice data, the voice signal having an observing point position corresponding to a selected one of the one or more audio viewpoints, and the selected one of the one or more video viewpoints and the selected one of the one or more audio viewpoints are associated with a same viewpoint identifier.

2. The transmission apparatus according to claim 1, wherein the coordinate information of the one or more audio viewpoints includes information regarding azimuth angles and elevation angles that indicate positions of the one or more audio viewpoints.

3. The transmission apparatus according to claim 1, wherein the audio viewpoint syntax further arranges the one or more audio viewpoints into one or more groups.

4. The transmission apparatus according to claim 1, wherein the spatial voice data is data of scene-based audio.

5. The transmission apparatus according to claim 4, wherein the data of the scene-based audio is in a Higher Order Ambisonics (HoA) format.

6. The transmission apparatus according to claim 4, wherein the data of the scene-based audio and the audio viewpoint syntax are included in a packet of the audio stream.

7. The transmission apparatus according to claim 6, wherein the packet is an MPEG-H audio stream packet.

8. The transmission apparatus according to claim 6, wherein the packet is included in the container that is in an ISO Base Media File Format (ISOBMFF).

9. A transmission method, comprising:

generating a container that includes a video stream and an audio stream,
   the video stream including encoded image data of a projection picture, and
   the audio stream including encoded spatial voice data;

inserting rendering metadata in the container, the rendering metadata including video viewpoint syntax specifying one or more video viewpoints, one or more viewpoint identifiers respectively associated with the one or more video viewpoints, and corresponding coordinate information of the one or more video viewpoints;

inserting, by processing circuitry of a transmission apparatus, audio viewpoint syntax in the audio stream, the audio viewpoint syntax specifying one or more audio viewpoints, one or more parameters defining a number of the one or more audio viewpoints included in the audio viewpoint syntax, the one or more viewpoint identifiers respectively associated with the one or more audio viewpoints, and corresponding coordinate information of the one or more audio viewpoints; and transmitting, by transmission circuitry of the transmission apparatus, the container that includes the encoded image data, the encoded spatial voice data, the video viewpoint syntax, and the audio viewpoint syntax to a reception apparatus, wherein the video viewpoint syntax causes the reception apparatus to generate a main image from the encoded image data, the main image having a center position corresponding to a selected one of the one or more video viewpoints, the audio viewpoint syntax causes the reception apparatus to generate a voice signal from the encoded spatial voice data, the voice signal having an observing point position corresponding to a selected one of the one or more audio viewpoints, and the selected one of the one or more video viewpoints and the selected one of the one or more audio viewpoints are associated with a same viewpoint identifier.

10. A processing apparatus, comprising:

reception circuitry configured to:
   receive a container that includes a video stream and an audio stream,
      the video stream including encoded image data of a projection picture, and
      the audio stream including encoded spatial voice data; and processing circuitry configured to:
   obtain rendering metadata from the container, the rendering metadata including video viewpoint syntax specifying one or more video viewpoints, one or more viewpoint identifiers respectively associated with the one or more video viewpoints, and corresponding coordinate information of the one or more video viewpoints;
   obtain audio viewpoint syntax from the audio stream, the audio viewpoint syntax specifying one or more audio viewpoints, one or more parameters defining a number of the one or more audio viewpoints included in the audio viewpoint syntax, the one or more viewpoint identifiers respectively associated with the one or more audio viewpoints, and corresponding coordinate information of the one or more audio viewpoints;
   generate a main image from the encoded image data, the main image having center position corresponding to a selected one of the one or more video viewpoints;
   generate a voice signal from the encoded spatial voice data, the voice signal having an observing point position corresponding to a selected one of the one or more audio viewpoints, wherein the selected one of the one or more video viewpoints and the selected one of the one or more audio viewpoints are associated with a same viewpoint identifier.

11. The processing apparatus according to claim 10, wherein the coordinate information of the one or more audio viewpoints includes information regarding azimuth angles and elevation angles that indicate positions of the one or more audio viewpoints.

12. The processing apparatus according to claim 10, wherein the spatial voice data is data of scene-based audio.

13. The processing apparatus according to claim 12, wherein the data of the scene-based audio is in a Higher Order Ambisonics (HoA) format.

14. The processing apparatus according to claim 12, wherein the data of the scene-based audio and the audio viewpoint syntax are received from a media.

15. The processing apparatus according to claim 12, wherein the data of the scene-based audio and the audio viewpoint syntax are included in a packet of the audio stream.

16. The processing apparatus according to claim 15. wherein the packet is an MPEG-H audio stream packet.

17. The processing apparatus according to claim 10, wherein the processing circuitry is configured to determine the selected one of the one or more video viewpoints and the selected one of the one or more audio viewpoints on a basis of an attribute or a contractual coverage of a user.

18. The processing apparatus according to claim 10, wherein the processing circuitry is further configured to control user notification of a relationship between a position of a current viewpoint and a position indicated by the selected one of the one or more video viewpoints.

19. A processing method, comprising:
receiving, by reception circuitry of a processing apparatus, a container that includes a video stream and an audio stream,
    the video stream including encoded image data of a projection picture, and
    the audio stream including encoded spatial voice data;
obtaining metadata from the container. the rendering metadata including rendering video viewpoint syntax specifying one or more video viewpoints, one or more viewpoint identifiers respectively associated with the one or more video viewpoints, and corresponding coordinate information of the one or more video viewpoints;
obtaining audio viewpoint syntax from the audio stream. the audio viewpoint syntax specifying one or more audio viewpoints, one or more parameters defining a number of the one or more audio viewpoints included in the audio viewpoint syntax, the one or more viewpoint identifiers respectively associated with the one or more audio viewpoints, and corresponding coordinate information of the one or more audio viewpoints;
generating a main image from the encoded image data, the main image having a center position corresponding to a selected one of the one or more video viewpoints;
generating, by processing circuitry of the processing apparatus, a voice signal from the encoded spatial voice data, the voice signal having an observing point position corresponding to a selected one of the one or more audio viewpoints,
wherein the selected one of the one or more video viewpoints and the selected one of the one or more audio viewpoints are associated with a same viewpoint identifier.

* * * * *